United States Patent [19]
Higuchi et al.

[11] Patent Number: 6,160,576
[45] Date of Patent: *Dec. 12, 2000

[54] IMAGE COMPENSATING DEVICE BASED ON AGE-RELATED CHARACTERISTICS

[75] Inventors: Kazunori Higuchi, Aichi-ken; Tomoaki Nakano; Shin Yamamoto, both of Nagoya, all of Japan

[73] Assignee: Kabushiki Kaisha Toyota Chuo Kenkyusho, Aichi-gun, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/685,667

[22] Filed: Jul. 24, 1996

[30] Foreign Application Priority Data

Jul. 25, 1995  [JP]  Japan ..................................... 7-210078

[51] Int. Cl.$^7$ ...................................................... H04N 9/47
[52] U.S. Cl. .............................................................. 348/62
[58] Field of Search ................................. 348/62, 61, 63; H04N 9/47

[56] References Cited

U.S. PATENT DOCUMENTS 4,494,838   1/1985   Wallquist et al. .

FOREIGN PATENT DOCUMENTS 2 555 003   5/1985   France .

OTHER PUBLICATIONS

Clinical Vision Sciences, vol. 3, No. 2, pp. 125–135, 1988, Teri B. Lawton, "Improved Word Recognition for Observers with Age–Related Maculopathies Using Compensation Filters".

Intelligent Robots and Computer Vision IX: Neural, Biological and 3–D Methods, vol. 1382, pp. 49–59, 1990, Eli Peli, "New Perspectives On Image Enhancement for the Visually Impaired".

1994 SID International Symposium Digest of Technical Papers, vol. 25, pp. 36–39, Jun. 14–16, 1994, E. Peli, et al., "Video Enhancement for the Visually Impaired".

Virtual Reality World, vol. 2, No. 3, pp. 63–65, May/Jun. 1994, Dr. Ronald Siwoff, "DEI: Digitally Enhanced Imager".

Nissan Technological Report, vol. 33, pp. 72–78, Jun. 1993, Masami Funakawa, "Simulating the Vision of Older Drivers".

Investigative Opthalmology & Visual Science, vol. 32, No. 8, pp. 2337–2350, Jul. 1991, R. Goldstein, et al., "Image Enhancement for the Visually Impaired".

Television, vol. 27, No. 4, pp. 235–242, 1973, H. Sakata, et al., "Frequency Response Correction of Television Signal by Using Spatial Frequency Technique".

*Primary Examiner*—Young Lee
*Attorney, Agent, or Firm*—Oblon, Spivak, McClelland, Maier & Neustadt, P.C.

[57] ABSTRACT

An image processing device compensates an original image for helping deteriorated human vision characteristics and displays the compensated image. Declines in a spectral sensitivity characteristic is compensated for by multiplying a brightness value of the original image by an inverse characteristic 1/A of a relative spectral sensitivity characteristic A in reference to a predetermined spectral sensitivity characteristic of a standard person. The first compensated image q(x,y) for defocus, or declines in accommodation characteristic, is obtained by a convolution integral of an original input image f(x,y) and a function j(x,y). The second compensated image m(x,y) for declines in sensitivity to cut-off frequency is obtained by a convolution integral of an original input image q(x,y) and the function p(x,y). The j and the p vary utilizing a radius of a blurred image and the cut-off frequency as a parameter, respectively. The image processing device enables an observer to recognize the original image as it is or as observed by the standard person, regardless of age or individual variations.

19 Claims, 16 Drawing Sheets

| Age | B Compensated Relative Sensitivity | G Compensated Relative Sensitivity | R Compensate Relative Sensitivity |
|---|---|---|---|
| 20 | 1 | 1 | 1 |
| 30 | 1.1 | 1.05 | 1 |
| 40 | 1.3 | 1.15 | 1 |
| 50 | 1.5 | 1.25 | 1 |
| 60 | 2 | 1 | 1.05 |
| 70 | 2.5 | 1.25 | 1.1 |
| 80 | 3 | 1.5 | 1.15 |
| 90 | 3.5 | 1.75 | 1.2 |

$h'_B = T \cdot h_B$ $h'_G = T \cdot h_G$ $h'_R = T \cdot h_R$

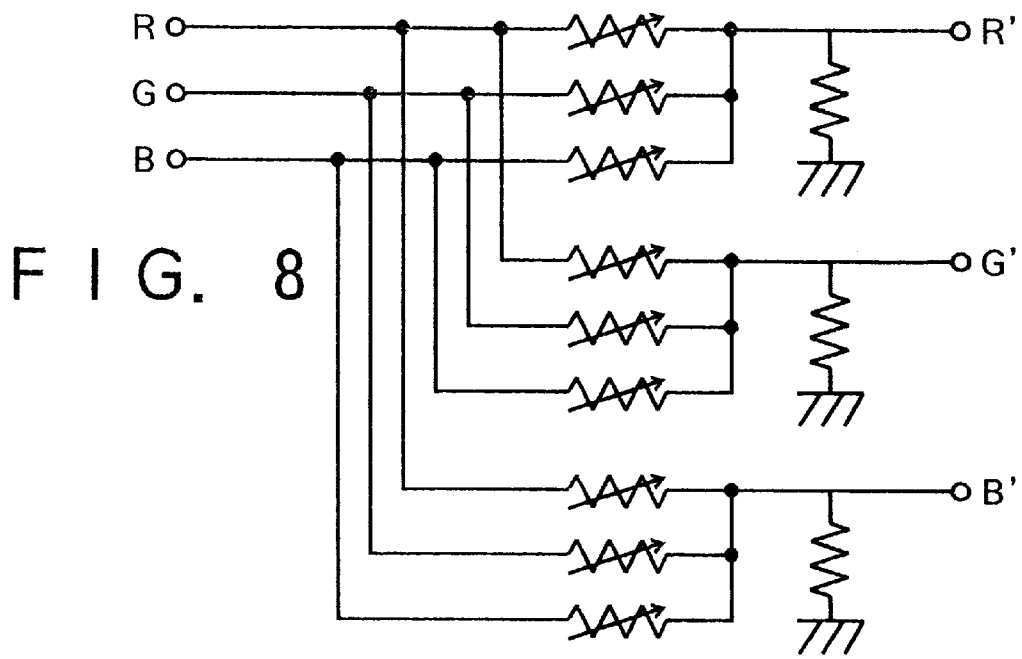
F I G. 8
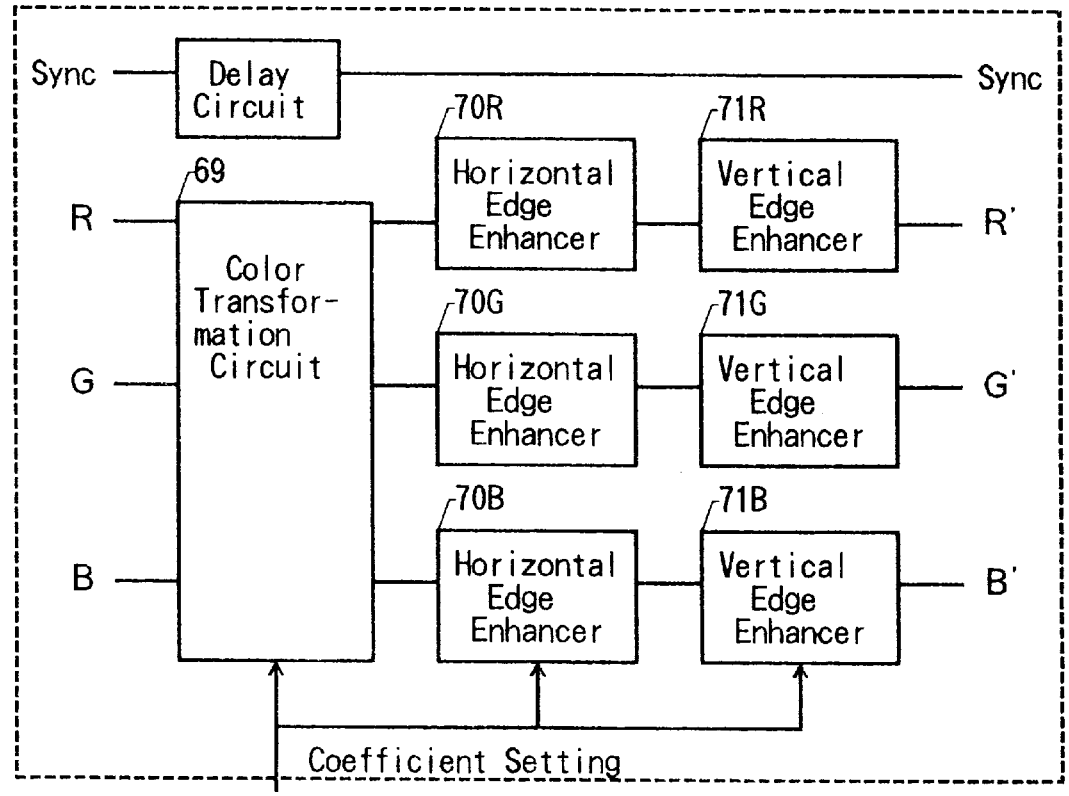
F I G. 9

Sh1 : Separated signal of Sh0

Sh2 : Delayed signal by t sec. of Sh1

Sh3 : Sh2 × 2

Sh4 : Delayed signal by 2t sec. of Sh1

Sh5 : Sh1 + Sh4 − Sh3

Sh6 : Sh2 − Sh5 × ch0
(e.g. ch0 =0.4 )

Horizontal Edge
Enhancement (±1t)

Sh11 : Separated Signal of Sh0

Sh12 : Delayed Signal by t sec. of Sh11

Sh13 : Delayed Signal by 2t sec. of Sh11

Sh14 : Delayed Signal by 3t sec. of Sh11

Sh15 : Delayed Signal by 4t sec. of Sh11

Sh16 : Sh13−Sh12+Sh13−Sh14

Sh17 : Sh12−Sh11+Sh14−Sh15

Sh18 : Sh16×ch1 +Sh17×ch2 (e.g. ch1=0.6, ch2 =0.2)

Sh19 : Sh13+Sh18

Horizontal Edge Enhancement (±2t)

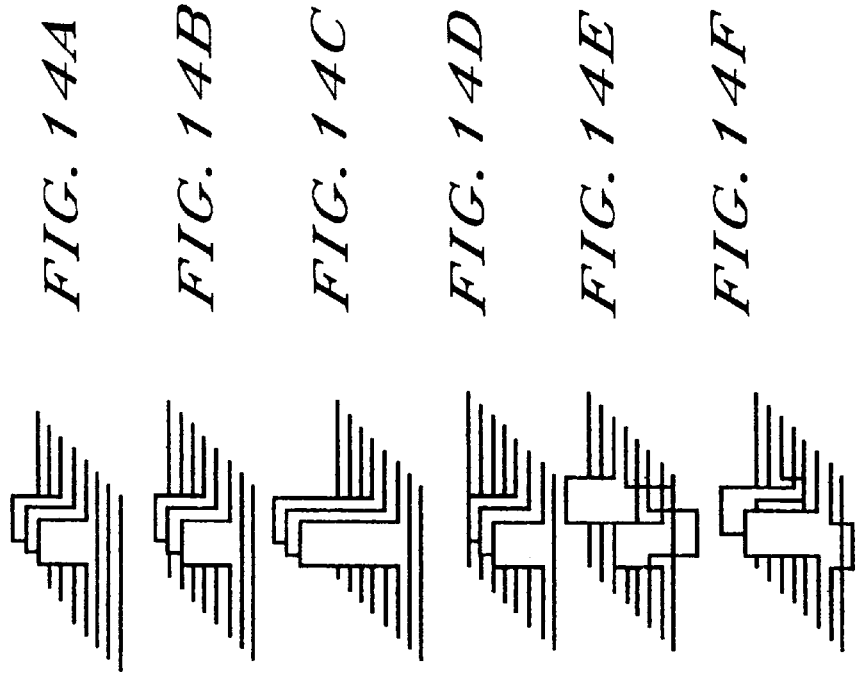
FIG. 14A
FIG. 14B
FIG. 14C
FIG. 14D
FIG. 14E
FIG. 14F
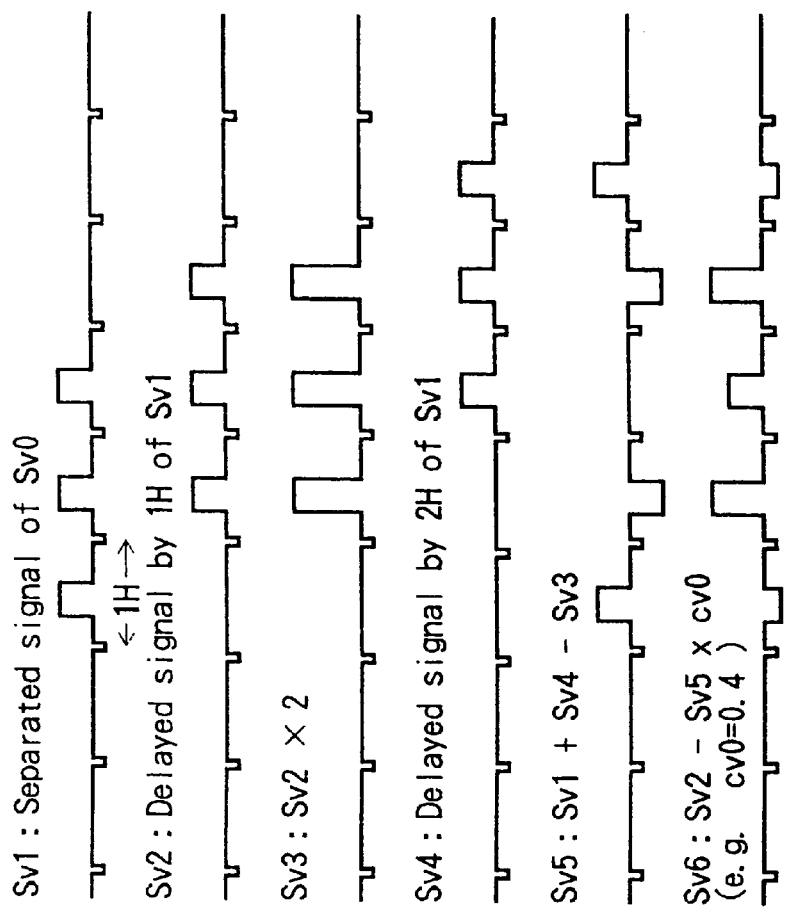
Sv1 : Separated signal of Sv0
Sv2 : Delayed signal by 1H of Sv1
Sv3 : Sv2 × 2
Sv4 : Delayed signal by 2H of Sv1
Sv5 : Sv1 + Sv4 − Sv3
Sv6 : Sv2 − Sv5 × cv0
(e.g. cv0=0.4)
Vertically Edge Enhancement (±1H)

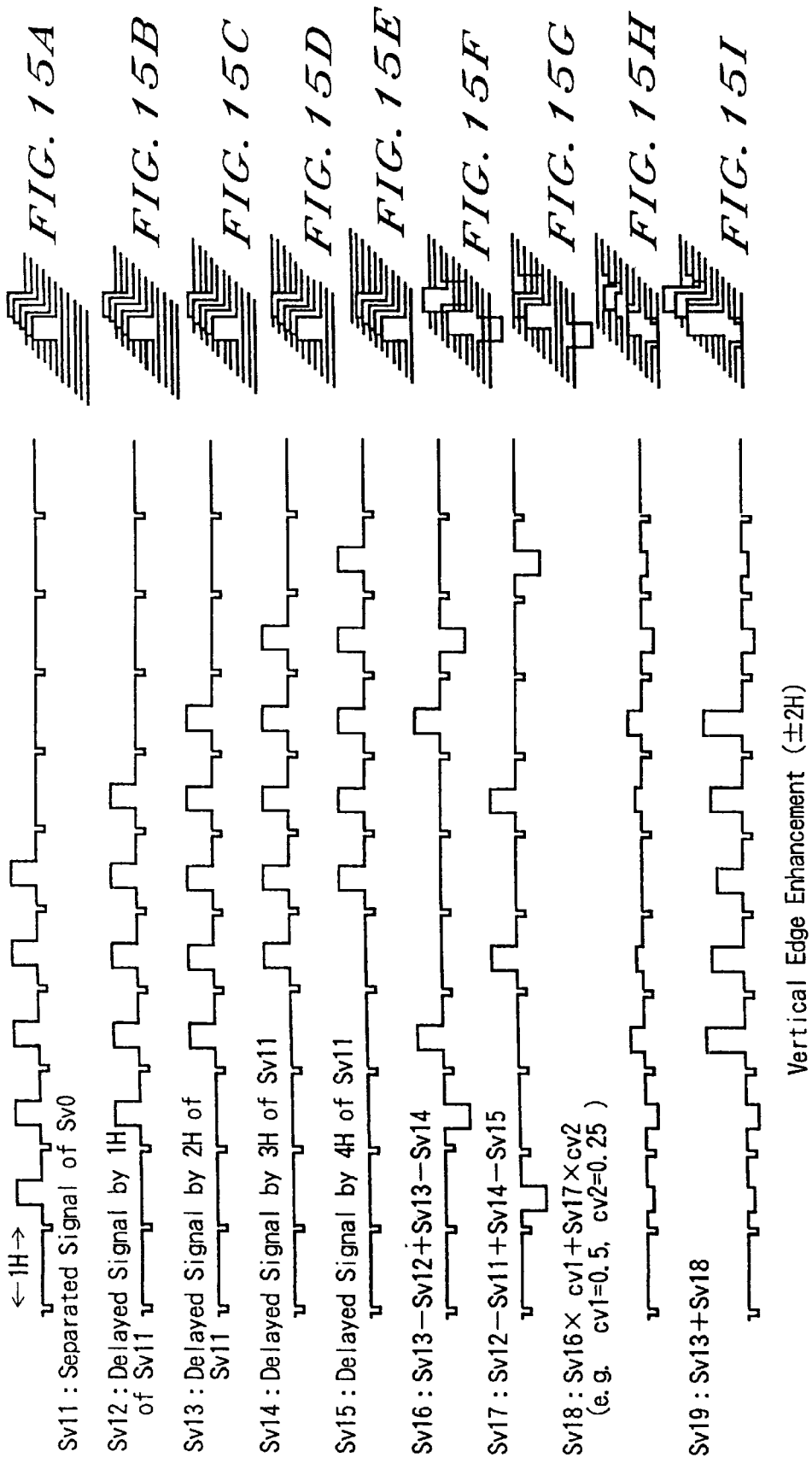

IMAGE COMPENSATING DEVICE BASED ON AGE-RELATED CHARACTERISTICS

BACKGROUND OF THE INVENTION

1. Field of the Invention

The present invention relates to an image processing device for producing a compensated image which is easy to read and recognize for the elder whose visual functions declined because of aging and for the visually impaired involving individual variations. Further, the present invention relates to an image processing device for simulating the compensated image.

2. Description of Background Information

Conventionally, a visual recognition of an image to elder drivers is simulated (Funakawa. "Simulating the Vision of Older Drivers". Nissan Technological Report. Vol. 33. June 1993. pp.73–78.). This simulation measures age-related declines in vision characteristics of human eyes, and images likely to be projected by the elder drivers are calculated based on the declines in their vision characteristics.

Although visual simulations of the elder drivers are known, few studies and devices are provided for producing images easy to see for the elder drivers regardless of age or individual variations.

Further, few studies and devices provide a compensated image for the low vision considering individual variations in their vision characteristics.

SUMMARY OF THE INVENTION

An object of the present invention is, therefore, to provide an processed image which is easy for the elder and the low vision to read and recognize.

A first aspect of the present invention is directed to an image processing device which compensates for an original image and displays a compensated image after compensation of the original image based on a human vision characteristic.

A second aspect of the present invention is to consider age-related changes of the human vision characteristic for an image compensation and a third is to consider their individual variations.

A fourth aspect of the present invention is to employ a spatial frequency characteristic of contrast sensitivity of a human visual system for an image compensation, and a fifth is to employ a wavelength characteristic of contrast sensitivity, or a spectral sensitivity characteristic, of a human visual system. A sixth aspect is to employ a wavelength characteristic of optical transmissivity, or a spectral transmissivity, of crystalline lens of human eyes as the wavelength characteristic of contrast sensitivity, and a seventh is to employ a spatial frequency characteristic of contrast sensitivity varying according to accommodation of human eyes as the human vision characteristic.

A eighth aspect of the present invention is to employ a brightness characteristic of contrast sensitivity, or a brightness sensitivity characteristic, for a human visual system as the human vision characteristic, a ninth is to employ a temporal frequency characteristic of contrast sensitivity, or a temporal frequency sensitivity characteristic, for a human visual system, and a tenth is to employ a color hue characteristic of contrast sensitivity or a color hue sensitivity characteristic of a human visual system as the human vision characteristic.

An eleventh aspect of the present invention is to compensate an original image based on a predetermined standard vision characteristic and a human vision characteristic, and a twelveth is to compensate the original image based on a relative characteristic of the human vision characteristic with respect to the predetermined standard vision characteristic.

Further, a thirteenth aspect of the present invention is to employ a vision characteristic for a human visual system at standard age as the predetermined standard vision characteristic, and a fourteenth is to employ a vision characteristic for a human visual system of a standard person as the predetermined standard vision characteristic.

A fifteenth aspect of the present invention is to compensate the original image partially and a sixteenth is to alter compensation amount according to visual recognition time. This vision recognition time varies according to traveling time of the observer or the display, or car speed.

A seventeenth aspect of the present invention is to compensate the original image based on edge enhancement with respect to the spatial frequency characteristic, an eighteenth aspect is to compensate for each of color signal values red (R), green(G), and blue (B) of the original image based on a relative sensitivity, a nineteenth aspect is to compensate for each of the color signal values R, G, and B of the original image based on the wavelength and spatial frequency characteristics of contrast sensitivity, and a twentieth aspect is to compensate for a brightness signal of an image signal in the original image based on the spatial frequency characteristic.

A twenty first aspect of the present invention is directed to an image processing device further constituted by an image input device for inputting image data of the original image to be displayed on the display, a variable input device for inputting a variable corresponding to age of an observer of the display a characteristic value memory for storing a variable and a characteristic value for compensating for the original image based on a vision characteristic according to age of an observer, and an image compensation calculator for calculating a compensated image by determining a characteristic value from the variable and by compensating the image data based on the characteristic value.

Human vision characteristics involve age related declines and individual variations. Accordingly, images recognized by observers vary person to person, being influenced by age and the individual variations. The image processing device of the present invention is able to provide an image easier to see and recognize according to the individual visual characteristics.

Because a recognized image from an original image is influenced and altered by the age related declines and individual variations in the human vision characteristics, easiness to see of the original image varies among its observers. Compensating the original image for influences by the age related declines and the individual variations enables the observers to see and recognize the original image as it is.

When a spatial frequency characteristic of contrast sensitivity for a human visual system is selected as a human vision characteristic, the original image can be compensated for distortion amount in the observer's image recognition, and the compensated image is optimized to its observer.

When a wavelength characteristic of contrast sensitivity of a human visual system is selected as a human vision characteristic, a compensated image for changes in color hue can be provided according to its observer.

When a wavelength characteristic of optical transmissivity of the human crystalline lens is selected as a human vision characteristic, easiness of measuring the wavelength characteristic of contrast sensitivity increases, and compensation coefficients for image compensation can be more precisely obtained.

When a spatial frequency characteristic of contrast sensitivity varying according to accommodation of human eyes is selected as a human vision characteristic, declines in eyesight due to aging or individual variations can be compensated and an image easier to see can be provided to all observers.

When a brightness characteristic of contrast sensitivity for a human visual system is selected as a human vision characteristic, a compensated image for sensitivity to changing brightness of an image can be obtained and an image easier to see for brightness value contrast can be provided.

When a temporal frequency sensitivity characteristic for a human visual system is selected as a human vision characteristic, for example by increasing brightness value contrast more where the temporal frequency is higher, deterioration in function of a temporal frequency characteristic in high-speed image can be compensated according to age or individual variations of the observers.

When a color hue characteristic of contrast sensitivity for a human visual system is selected as a human vision characteristic, changes in color hue is enhanced according to age, and individual variations of the observers. As a result, image easier to recognize changes in color hue can be provided.

Compensating an original image based on both a predetermined standard vision characteristic and a human vision characteristic according to age or individual variations enables to equalize a compensated image recognized by those who have declined vision characteristics to an original image recognized by a person with the standard vision characteristic. As the standard vision characteristic, it is possible to adopt a visual characteristic of a person in good conditions or an ideal vision characteristic beyond a human vision characteristic. Further, compensating the original image based on a relative characteristic between a vision characteristic and the standard vision characteristic enables to produce a compensated image easily along with the purpose of the present invention.

Selecting a human vision characteristic at a standard age as the standard vision characteristic enables to equalize a compensated image recognized by any persons of given age to an original image recognized by a person at the standard age by compensating for age-related declines in human vision characteristics.

Further, by selecting a vision characteristic of a standard person as the standard vision characteristic, it is possible to reduce influences of individual variations in vision characteristics and to equalize a compensated image recognized by the individual to an original image recognized by the standard person.

Further, it is possible to provide an image easier to see by compensating for a certain area of the displayed image, i.e., where letters are displayed in high density.

Altering compensation amount given to the original image according to its visual recognition time which varies based on traveling time of the observer or the display, or car speed enables to increase degree of recognition of the compensated image even when it is displayed instantaneously. Enhancing edge of the original image enables to produce a compensated image easily. Compensating each of the color values R, G, and B based on a relative sensitivity provides a compensated image very easily.

Compensation for each of the color values R, G, and B based on wavelength and spatial frequency characteristics of contrast sensitivity enables to share circuits and simplify the device structure, when the original image data uses the color values R, G, and B. Further, compensating for a brightness signal of an image signal in the original image based on a spatial frequency characteristic realizes easier compensation of the image displayed on a display.

A variable according to age of the observer are input by a variable input device and an image data is input by an image input device. An image compensation device determines a characteristic value for image data compensation based on the variable and a characteristic value stored in a characteristic value storing device and compensates the image data based on the determined characteristic value. The compensated image data is displayed by a display device. Altering the variable from the variable input device enables to display an image to see easily according to its observers.

The above and other objects, features, advantages, and characteristics of the present invention are further described in the following detailed description with reference to the accompanying drawings by way of non-limiting exemplary embodiments of the present invention, wherein like reference numerals represent similar parts of the present invention throughout the several views.

BRIEF DESCRIPTION OF THE DRAWING

In the accompanying drawings:

FIG. 8 is a circuit diagram showing a concrete structure of a color compensator or a color transformation circuit;

FIG. 9 is a block diagram showing a structure of a compensator for spatial frequency characteristic and spectral sensitivity characteristic of an image signal;

FIGS. 14 and 15 are timing charts showing signal processing steps by the vertical edge enhancer;

DETAILED DESCRIPTION OF EXEMPLARY EMBODIMENTS

The present invention will be more fully understood by reference to the following example.

EXAMPLE

Figure 1:
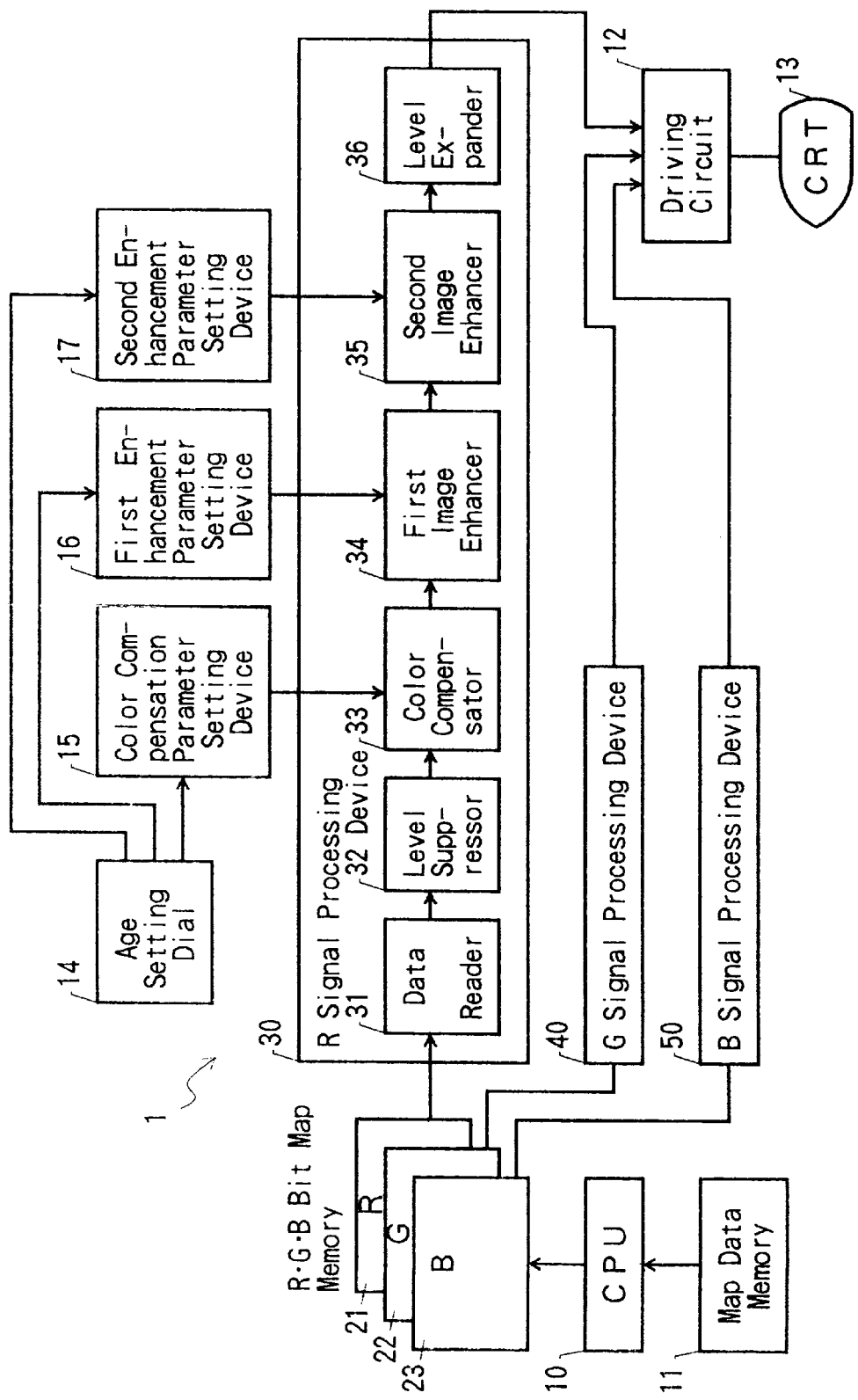
FIG. 1 is a block diagram showing a structure of an image processing device in the example set forth below.

FIG. 1 shows a navigation system 1 installed in a car enabling to adjust display of a map depending on age of an observer. The navigation system 1 has a map data memory 11 which stores color map data of every range of view from a detailed map to an entire view. Following a predetermined program, a CPU 10 selects a map data which is to be displayed on a CRT 13 from the map data memory 11 and writes the map data into bitmap memories 21, 22, and 23. Each of the bitmap memories 21, 22, and 23 has addresses corresponding to the numbers of pixels on a screen of the CRT 13 and stores the map data of each of the color values red (R), green (G), and blue (B), respectively. Each pixel comprises data of the three colors values R, G, and B, each having 256 steps of a brightness value.

In a conventional navigation system, a colored map on the CRT 13 based on data of the three color values R, G, and B stored in the bitmap memories 21, 22, and 23 is displayed by a driving circuit 12.

In the navigation system 1 of the present invention, the map data of color values R, G, and B stored respectively in the bitmap memories 21, 22, and 23 is read and compensated. Then, a compensated image or map is displayed on the CRT 13 based on the compensated data. For that compensation process of each data of color values R, G, and B, an R signal processing device 30, a G signal processing device 40, and a B signal processing device 50 are installed in the navigation system 1. The R signal processing device 30 compensates the color value of red (R) comprising a data reader 31 which sequentially reads the data from the R bit map memory 21, a level suppressor 32 which suppresses data level of the color value R, a color compensator 33 which compensates for a color balance of the color value R depending on age of an observer, a first image enhancer 34 which compensates for a blurred image caused by defocus of the observer, a second image enhancer 35 which compensates for a spatial frequency characteristic of a contrast sensitivity of the observer, and an expander 36 which expands the suppressed data level. The G signal processing device 40 and the B signal processing device 50 have the same structure and function as the R signal processing device for processing the color values G and B, respectively. The compensated signals R', G', and B' respectively output from the signal processing devices 30, 40, and 50 are input into a driving circuit 12 and a compensated image is displayed on the CRT 13. The original color values, signals or data are denoted by R, G, and B and the compensated one as R', G', and B' hereinafter.

Further, in order to determine compensation amount of the image, the navigation system 1 is additionally equipped with an age dial 14, a color compensation parameter setting device 15, and first and second enhancement parameter setting devices 16 and 17. The age dial 14 enables to set three variables with respect to the compensation amount of color balance, blur by defocus, and spatial frequency characteristics, independently according to age of the observer. The color compensation parameter setting device 15 determines amount of color compensation according to the values set by the age dial 14. The first enhancement parameter setting device 16 and the second enhancement parameter setting device 17 determine amount of image enhancement according to the values set by the age dial 14. Each value set by the parameter setting devices 15, 16, and 17 is respectively read by the color compensator 33, the first image enhancer 34, and the second image enhancer 35 installed in the signal processing device 30 and corresponding units in the signal processing devices 40 and 50.

Performance of the navigation system 1 is explained hereinafter. Because the signal processing devices 30, 40, and 50 function equivalently, only the performance of the signal processing device 30 for processing the color value R is illustrated.

The data reader 31 sequentially reads data for scanning a screen from the R bit map memory 21. Reading rate of the data is equal to the scanning rate of a television signal. Level value of the data is suppressed by the level suppressor 32 to prevent the brightness value from being saturated over 255 by a succeeding compensation calculation. The level of the data is suppressed by multiplying a constant k ($0 \leq k \leq 1$). More concretely, so as to change the original brightness value X which ranges from 0 to 255 into the suppressed brightness value Y, where $0 \leq L_{min} \leq Y \leq L_{max} \leq 255$, the value Y is calculated by an equation, $Y=(L_{max}-L_{min})X/255+L_{min}$.

The, the color compensator 33 compensates for the color balance of an image according to age of an observer.

Visual characteristics of human beings such as an optical absorptivity, a scattering factor, a reflection factor, an optical transmittance of eyeballs, and sensitivity of a retinal optic cell, are widely known for their age-related declines. In addiction, those visual characteristics vary according to wavelength. A wavelength characteristic of contrast sensitivity of human visual system vary according to age of the observer. Concretely, the wavelength characteristics in a short wavelength region is widely known for its age related decline and an image recognized by the old is reported to be more yellowish than that by the young, in general.

A standard sensitivity wavelength characteristic $\alpha_0(\lambda)$ (transfer function), which means a standard wavelength characteristic of contrast sensitivity, is defined as a ratio of an incident light spectral distribution $I(\lambda)$ to a recognition light spectral distribution $O_0(\lambda)$ of a standard person, i.e., 20 years old, utilizing the following equation:

$$O_0(\lambda)=\alpha_0(\lambda) \cdot I(\lambda). \tag{1}$$

A sensitivity wavelength characteristic $\alpha_X(\lambda)$ of age X, or a transfer function, is defined as a ratio of the incident light spectral distribution $I(\lambda)$ to a recognition light spectral distribution $O_X(\lambda)$ of age X utilizing the following equation:

$$O_X(\lambda)=\alpha_X(\lambda) \cdot I(\lambda). \tag{2}$$

A relative sensitivity wavelength characteristic $A_X(\lambda)$ of age X is defined as a ratio of the sensitivity wavelength characteristic $\alpha_X(\lambda)$ of age X to the standard sensitivity wavelength characteristic $\alpha_0(\lambda)$ utilizing the following equation (described as a relative sensitivity hereinafter):

$$A_X(\lambda)=\alpha_X(\lambda)/\alpha_0(\lambda). \tag{3}$$

Figure 2:
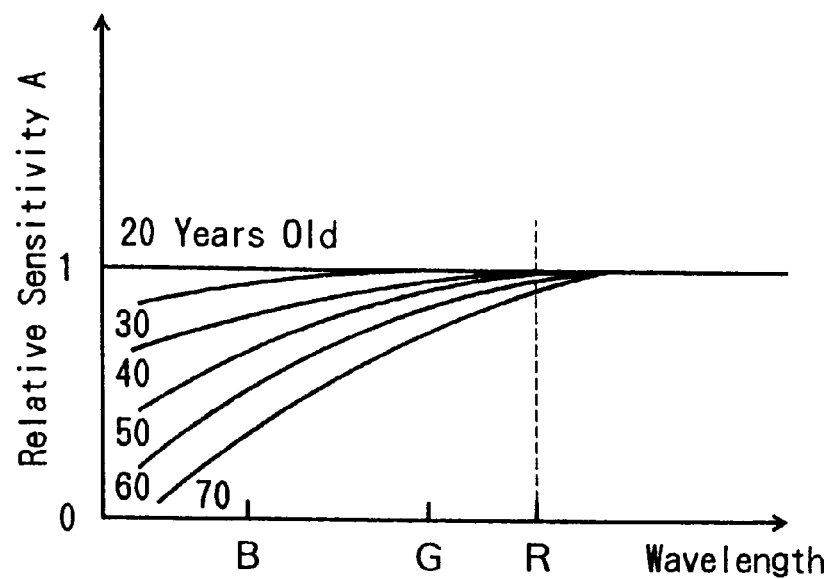
FIG. 2 is a graph showing a relative sensitivity with a parameter of age.

For an example, the sensitivity to a light in a short wavelength region is declined more with aging as shown in FIG. 2. A brightness spectral characteristic $I'(\lambda)$ of a compensated image which equalizes a recognition light spectral distribution $O'_X(\mu)$ of age X with the recognition light spectral distribution $O_0(\lambda)$ of the standard person is determined by the following equation:

$$O_X(\lambda) = \alpha_X(\lambda) \cdot I'(\lambda)$$

$$= O_0(\lambda) = \alpha_0(\lambda) \cdot I(\lambda)$$

$$I'(\lambda) = [\alpha_0(\lambda)/\alpha_X(\lambda)] \cdot I(\lambda)$$

$$= [1/A_X(\lambda)] \cdot I(\lambda). \quad (4)$$

Figure 3:
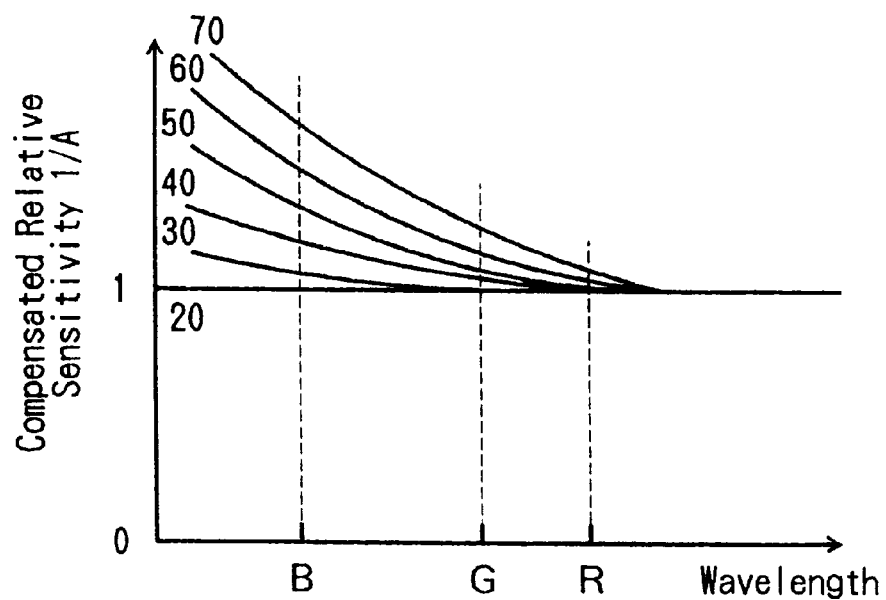
FIG. 3 is a graph showing a compensation relative sensitivity with a parameter of age.

As shown by Eq. 4, the brightness spectral characteristic $I'(\lambda)$ of a compensated image is obtained by multiplying the brightness of the original image $I(\lambda)$ by an inverse characteristic $1/A_X(\lambda)$ shown in FIG. 3 of the relative sensitivity wavelength characteristic $A_X(\lambda)$. Accordingly, when an observer looks at such a compensated image calculated by Eq. 4, his recognizing image is equal to the image which the standard person of 20 years old recognizes when the standard person looks at the original image, regardless of the observer's age.

An image on a screen is constituted by three color values R, G, and B. Therefore, the issue is how to calculate the compensated color values R', G', and B' from those original color values R, G, and B. Each component is calculated from Eq. 4 as the following equation:

$$R' = \int I'(\lambda) h_R(\lambda) d\lambda$$

$$= \int [1/A_X(\lambda)] I(\lambda) h_R(\lambda) d\lambda. \quad (5)$$

When $R' = R/A_R$ $$A_R = \int I(\lambda) h_R(\lambda) d/\int [1/A_X(\lambda)] I(\lambda) h_R(\lambda) d\lambda. \quad (6)$$

In Eq. 6, $h_R(\lambda)$ denotes a retinal spectral sensitivity characteristic to a red color light and $A_R$ is a retinal relative sensitivity to the red color light. Similarly, $A_G$ and $A_B$ are defined with respect to components G and B.

The relative sensitivity wavelength characteristic $A_X(\lambda)$ is obtained by directly measuring a transfer function of a visual system of human beings. However, an issue is how to obtain the relative sensitivity $A_R$, $A_G$, and $A_B$.

First, when emission from each pixel on a screen is constituted by a single wavelength of each of the three pure primary colors R, G, and B, the retinal relative sensitivity $A_R$, $A_G$, and $A_B$ are easily obtained by calculating an inverse relative sensitivity wavelength characteristic $1/A_X(\lambda)$ at the respective single wavelengths.

Second, when the emission from each pixel on a screen is constituted by a broad wavelength of the three primary colors R, G, and B, obtaining $A_R$, $A_G$, and $A_B$ is not simple. In principle, $A_R$, $A_G$, and $A_B$ are possible to be obtained by substituting $I(\lambda)$ which is composed based on the color values R, G, and B for $I(\lambda)$ in Eq. 6. In this case, as the color values R, G, and B of the original image vary, $A_R$, $A_G$, and $A_B$ change accordingly. Therefore, many sets of $A_R$, $A_G$, and $A_B$ are predetermined for its corresponding color value sets of R, G, and B, and $A_R$, $A_G$, and $A_B$ at any values R, G, and B are calculated through interpolation of the predetermined values.

The first way for composing $I(\lambda)$ from the color values R, G, and B is to generate a spectral characteristic for each of the color values R, G, and B. Then, a main wavelength for each of them is determined by referring to a chromaticity diagram. The respective spectral characteristics with predetermined dispersion whose peak value are proportional to the respective color values R, G, and B, are located so as to equalize the peak wavelengths to the dominant wavelengths, respectively. The $I(\lambda)$ can be obtained by the spectral characteristics modified as described above.

The second way for composing $I(\lambda)$ from the color values R, G, and B utilizes luminous characteristics of the display. The luminous characteristics are a $\Gamma$ characteristic and a spectral energy distribution of a fluorescent material in case of a cathode-ray tube (CRT), and are a $\Gamma$ characteristic, spectral energy distribution of a back light, and a filter characteristic in case of a liquid crystal display (LCD).

In case of CRT, $I(\lambda)$ is obtained by:

$$I(\lambda) = \Gamma_R(R) P_R(\Gamma) + \Gamma_G(G) P_G(\lambda) + \Gamma_B(B) P_B(\lambda). \quad (7)$$

Here, $\Gamma_R(R)$, $\Gamma_G(G)$, and $\Gamma_B(B)$ respectively denote the gamma characteristics of the fluorescent material R, G, and B, and $P_R(\lambda)$, $P_G(\lambda)$, and $P_B(\lambda)$ respectively denote spectral energy distribution of the fluorescent material R, G, and B.

As described above, many sets of $A_R$, $A_G$, and $A_B$ are predetermined for its corresponding color value sets of R, G, and B. Without storing the predetermined sets, $I(\lambda)$ may be composed based on the color values R, G, and B of the original image as described above and the color values R', G', and B' of the compensated image can be calculated directly in real time bases.

Further, when an image is obtained by a reflection light, calculating the spectral characteristic of a illumination light becomes the issue. In this case, many sets of $A_R$, $A_G$, and $A_B$ are predetermined for its corresponding color value sets of R, G, and B of the luminous light and the original image. After $A_R$, $A_G$, and $A_B$ are obtained through interpolation, the color values R', G', and B' of the compensated image are calculated as a compensation of the original image. As an alternate, storing the spectral characteristic of the illumination light in advance, $I(\lambda)$ may be composed based on the spectral characteristic and the color values R, G, and B of the original image as described above and the color values R', G', and B' of the compensated image can be calculated directly in real time bases.

Further, as the roughest approximation, a common set of $A_R$, $A_G$, and $A_B$ may be predetermined for any sets of R, G, and B.

Figures 4, 5:
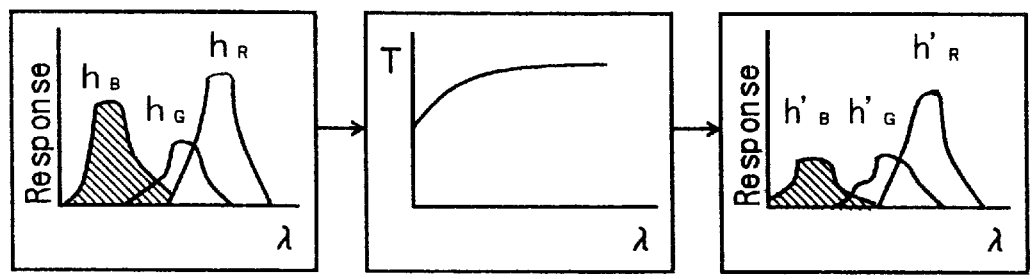
FIG. 4 is a table showing relations bet-ween ages and compensation relative sensitivity to each of color values red (R), green (G), and blue (B)
FIG. 5 is an explanatory view of sensitivity compensation to the color values R, G, and B.

The parameter setting device 15 for color compensation stores tabled data relating age data at an interval of 10 years to compensated relative sensitivity of each of the three primary colors based on the inverse relative sensitivity shown in FIG. 3. Because inverse relative sensitivity is used for compensating the original color values R, G, and B, the inverse relative sensitivity is also described as compensation relative sensitivity hereinafter. FIG. 4 is an example of the tabled data listing a common $A_R$, $A_G$, and $A_B$ for any combinations of the color values R, G, and B for each age. Alternatively, many tables may be prepared anticipating all possible combinations among the color values R, G, and B.

After the age dial 14 inputs an age value into the parameter setting device 15 and the compensation relative sensitivity of the age is calculated by interpolation based on the stored age data at an interval of 10 years. Then, each of the compensation relative sensitivity of the three primary colors obtained by interpolation is respectively output into the color compensators of the signal processing devices 30, 40, and 50.

The color compensator 33 is a multiplier which multiplies an output value of the level suppressor 32 by the compensation relative sensitivity and outputs into the first image enhancer 34. Through this process, the sensitivity decline of the aged in the short wavelength region is compensated.

In this embodiment, the compensated image is produced based on the relative sensitivity wavelength characteristic $A_X(\lambda)$ which is obtained by directly measuring sensitivity wavelength characteristic of 20 years old and that of each age.

Alternatively, the compensated image can be produced through calculations utilizing the relative sensitivity $A_R$, $A_G$, and $A_B$ of each color values R, G, and B obtained by a spectral transmittance wavelength characteristic T of eyeballs. In this case, because the brightness value $I(\lambda)$ of the original image is provided as R, G, and B which are integrated values of a wavelength function by a wavelength $\lambda$ the compensated image for the age X does not completely match to a recognized image by the standard person, but match nearly equal, when the compensated image is calculated by multiplying the color values R, G, and B of the original image by each of their inverse relative sensitivities.

When each brightness value of red, green, and blue colors of an image data is denoted as R, G, and B, each brightness value of those colors recognized by the 20 years old, or a standard person, can be described as $R_0$, $G_0$, and $B_0$ and a spectral transmittance of his eyeballs at the wavelength $\lambda$ is denoted as $T_0(\lambda)$. Further, the brightness values of each color recognized by an X years old person are defined as $R_X$, $G_X$, and $B_X$ and the spectral transmittance of his eyeballs at the wavelength is defined as $T_X(\lambda)$. Thus, we obtain:

$$R_0 = K \int T_0(\lambda) S(\lambda) r(\lambda) h_R(\lambda) d\lambda; \tag{8}$$

$$G_0 = K \int T_0(\lambda) S(\lambda) r(\lambda) h_G(\lambda) d\lambda; \tag{9}$$

$$B_0 = K \int T_0(\lambda) S(\lambda) r(\lambda) h_B(\lambda) d\lambda; \tag{10}$$

$$R_X = K \int T_X(\lambda) S(\lambda) r(\lambda) h_R(\lambda) d\lambda; \tag{11}$$

$$G_X = K \int T_X(\lambda) S(\lambda) r(\lambda) h_G(\lambda) d\lambda; \tag{12}$$

and $$B_X = K \int T_X(\lambda) S(\lambda) r(\lambda) h_B(\lambda) d\lambda. \tag{13}$$

Through the Eqs. 8 to 13, $S(\lambda)$ represents a spectral characteristic of an illumination, $r(\lambda)$ does a spectral reflectance of the subject, $h_R(\lambda)$, $h_G(\lambda)$, and $h_B(\lambda)$ represent retinal sensitivity characteristics of each of the three primary colors. Further, $S(\lambda)r(\lambda)$ is equal to the incident ray wavelength characteristic $I(\lambda)$.

Namely, as shown in FIG. 5, the retinal sensitivity characteristics are equivalently compensated using the spectral transmittance.

Relative sensitivities $A_R$, $A_G$, and $A_B$ of each retina cell for the three primary colors are obtained by integrating with respect to each wavelength and are expressed by:

$$A_R = R_X / R_0$$

$$= \int T_X(\lambda) S(\lambda) r(\lambda) h_R(\lambda) d\lambda / \int T_0(\lambda) S(\lambda) r(\lambda) h_G(\lambda) d\lambda; \tag{14}$$

$$A_G = G_X / G_0$$

$$= \int T_X(\lambda) S(\lambda) r(\lambda) h_G(\lambda) d\lambda / \int T_0(\lambda) S(\lambda) r(\lambda) h_G(\lambda) d\lambda; \tag{15}$$

and $$A_B = B_X / B_0$$

$$= \int T_X(\lambda) S(\lambda) r(\lambda) h_B(\lambda) d\lambda / \int T_0(\lambda) S(\lambda) r(\lambda) h_B(\lambda) d\lambda. \tag{16}$$

When brightness values of three primary colors of the original image denote R, G, and B and those of the compensated image denote R', G' and B', the compensated image is obtained by the following equations:

$$R' = R / A_R; \tag{17}$$

$$G' = G / A_G; \tag{18}$$

and $$B' = B / A_B. \tag{19}$$

As described above, each relative sensitivity of the three primary colors is obtained by measuring the transmittance wavelength characteristic, i.e., the spectral transmittance, according to age of eyeball.

Further, an alternative calculation exists for obtaining a compensated image. When a compensated image is observed by a person of age X, the red brightness value $R_X$ sensed by the person is expressed by:

$$R_X = K \int T_X(\lambda) T_X'(\lambda) S(\lambda) r(\lambda) h_R(\lambda) d\lambda. \tag{20}$$

In Eq. 20, $T_X'(\lambda) S(\lambda) r(\lambda)$ denotes a spectrum of an incident ray from the compensated image to the eyeball and $T_X(\lambda)$ denote an equivalent compensation transmittance wavelength characteristic. When the following equation is satisfied:

$$T_X(\lambda) T_X'(\lambda) = T_0(\lambda), \tag{21}$$

$R_X$ becomes equal to the brightness value $R_0$ sensed by the standard person by Eq. 20. From Eq. 21, we obtain $$T_X'(\lambda) = T_0(\lambda) / T_X(\lambda). \tag{22}$$

The red brightness value R' of the compensated image is obtained by the following equation with using $T_X'(\lambda)$.

$$R' = K \int T_X'(\lambda) S(\lambda) r(\lambda) h_R(\lambda) d\lambda. \tag{23}$$

The red brightness value of the original image is obtained by $$R = K \int S(\lambda) r(\lambda) h_R(\lambda) d\lambda. \tag{24}$$

Through Eqs. 23 and 24, eliminating the constant K, $$R' = R \int T_X'(\lambda) S(\lambda) r(\lambda) h_R(\lambda) d\lambda / \int S(\lambda) r(\lambda) h_R(\lambda) d\lambda$$

$$= R \int [T_0 / T_X(\lambda)] S(\lambda) r(\lambda) h_R(\lambda) d\lambda / \int S(\lambda) r(\lambda) h_R(\lambda) d\lambda$$

$$= R / A_R. \tag{25}$$

Accordingly, the relative sensitivity of the red color value R is obtained by:

$$A_R = \int S(\lambda) r(\lambda) h_R(\lambda) d\lambda / \int [T_0(\lambda) / T_X(\lambda)] S(\lambda) r(\lambda) h_R(\lambda) d\lambda. \tag{26}$$

Similarly, the relative sensitivity can be obtained with respect to brightness values G and B of green and blue color.

Alternatively, in Eq. 20, 1 may be substituted for $T_X(\lambda)$ $T_X'(\lambda)$. Namely, this alternative is to substitute 1 for $T_0(\lambda)$ and to set an eyeball which transmit lights of every wavelength region as the standard when the observer looks at the compensated image, the image recognized by the observer is ideal including light in short wavelength region.

$$R_X = K \int S(\lambda) r(\lambda) h_R(\lambda) d\lambda$$

$$= R$$

$$= R_0. \tag{27}$$

Therefore, $$T_X'(\lambda) = 1 / T_X(\lambda). \tag{28}$$

Using Eq. 28, the red brightness value R' of the compensated image is calculated by:

$$R' = K \int T_X'(\lambda) S(\lambda) r(\lambda) h_R(\lambda) d\lambda$$

$$= K \int [1 / T_X(\lambda)] S(\lambda) r(\lambda) h_R(\lambda) d\lambda. \tag{29}$$

$$R_0 = K \int T_0(\lambda) S(\lambda) r(\lambda) h_R(\lambda) d\lambda. \tag{30}$$

$$K = R_0 / \int T_0(\lambda) S(\lambda) r(\lambda) h_R(\lambda) d\lambda$$

$$= R' / \int T_0(\lambda) S(\lambda) r(\lambda) h_R(\lambda) d\lambda. \tag{31}$$

Accordingly, $$R' = K \int T'_X(\lambda) S(\lambda) r(\lambda) h_R(\lambda) d\lambda$$

$$= K \int [1/T_X(\lambda)] S(\lambda) r(\lambda) h_R(\lambda) d\lambda$$

$$= R \int [1/T_X(\lambda)] S(\lambda) r(\lambda) h_R(\lambda) d\lambda / \int T_0(\lambda) S(\lambda) r(\lambda) h_R(\lambda) d\lambda \tag{32}$$

Similarly, the brightness values G' and B' of the compensated image are obtainable.

Further alternatively, when $1/T_X(\lambda)$ is substituted for $T'_X(\lambda)$ in Eq. 23, the red brightness value R' of the compensated image by $1/T_X(\lambda)$ is calculated by:

$$R' = K \int T'_X(\lambda) S(\lambda) r(\lambda) h_R(\lambda) d\lambda$$

$$= K \int [1/T_X(\lambda)] S(\lambda) r(\lambda) h_R(\lambda) d\lambda. \tag{33}$$

Also, when $1/T_0(\lambda)$ is substituted for $T'_X(\lambda)$ in Eq. 23, the red brightness value R" of the compensated image by $1/T_0(\lambda)$ is calculated by:

$$R'' = K \int [1/T_0(\lambda)] S(\lambda) r(\lambda) h_R(\lambda) d\lambda. \tag{34}$$

Accordingly, $$K = R'' / \int [1/T_0(\lambda)] S(\lambda) r(\lambda) h_R(\lambda) d\lambda. \tag{35}$$

Substituting Eq. 35 for k in Eq. 33, $$R' = R'' \int [1/T_X(\lambda)] S(\lambda) r(\lambda) h_R(\lambda) d\lambda / \int [1/T_0(\lambda)] S(\lambda) r(\lambda) h_R(\lambda) d\lambda. \tag{36}$$

When the standard person with $T_0(\lambda)$ and the person of X year old with $T_X(\lambda)$ look at the respective images with the color values R" and R', both of them sensed by the two persons are equal to the original color value R. Accordingly, the ratio R"/R' can be used in approximate to the relative sensitivity $A_R$.

In result, $$R' = R \int [1/T_X(\lambda)] S(\lambda) r(\lambda) h_R(\lambda) d\lambda / \int [1/T_0(\lambda)] S(\lambda) r(\lambda) h_R(\lambda) d\lambda$$

$$= R / A_R. \tag{37}$$

Similarly, G' and B' can be obtained with respect to the brightness values G and B.

Here, RGB coordinate system is used. Alternatively, compensation may be possible utilizing XYZ coordinate system, or other color coordinated system.

Then, performance of the first image enhancer 34 is explained hereinafter. It is for compensating for image blur caused by defocus, or age related decline in focus, and for enhancing edges of an image.

Figure 6:
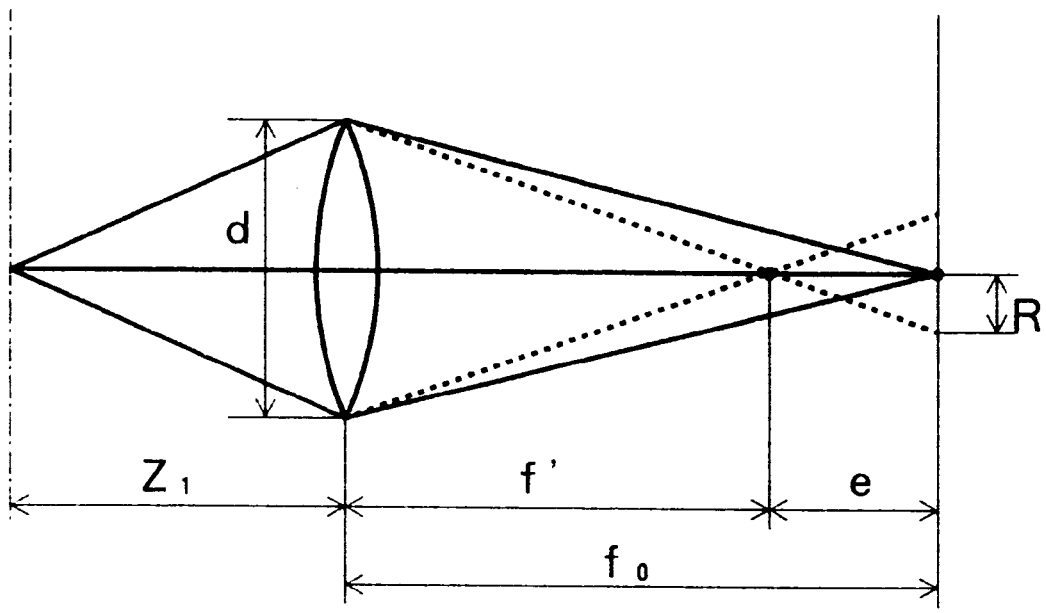
FIG. 6 is an view of explaining generation of a blurred image caused by defocus.

Amount of blur is calculated by measuring displacement of a shifted focus point based on geometrical optics. In FIG. 6, d denotes a diameter of a lens of an eye, $f_0$ a normal focus distance between the lens and the retina, $Z_1$ a distance between the lens and an object to see, f' a distance between the lens and the shifted focus point when the lens sees an object by distance $Z_1$, away, e a distance between the shifted focus point and the retina, and R a radius of spatially expanded blurred image on the retina.

The R is calculated by:

$$R = de/(2f'). \tag{38}$$

The e is calculated by:

$$e = |1/\{(n_1/n_2)D \times 10^{-3} + 1/f_0\} - f_0|. \tag{39}$$

In Eq. 39, the $n_1$ denotes a refraction index of the atmosphere, the $n_2$ does a refraction index of an eyeball, and D dose amount lacked for focus which is a function of age.

Then, an area or range of blurred image with radius R is calculated by a following impulse response function e(x,y) defined by a cylindrical function in range:

$$e(x,y) = 1/(\pi R^2) \quad (x^2 + y^2 \leq R^2)$$

$$= 0 (x^2 + y^2 > R^2). \tag{40}$$

When f(x,y) denotes of the original image and g(x,y) denotes the blurred image caused by defocus, the g(x,y) is obtained by a convolution integral of f(x,y) and e(x,y). F(u,v), G(u,v), and E(u,v) denote the functions obtained by Further transformation of the functions f, g, and e with respect to a spatial frequency (u,v).

$$G(u,v) = F(u,v) \cdot E(u,v). \tag{41}$$

The function E(u,v) is a transfer function of a defocusing system. When compensated image is q(x,y) and the Fourier transformation of q(x,y) is Q(u,v), the Q(u,v) is calculated by:

$$Q(u,v) = F(u,v) / E(u,v). \tag{42}$$

When the compensated image Q(u,v) is blurred by lack of accommodation, the blurred image becomes F(u,v) and the observer can recognize the original image.

A function defined by J(u,v)+1/E(u,v) is introduced and the inverse Further transformation of J(u,v) is defined as j(x,y). Accordingly, the compensated image q(x,y) in a real space is calculated by a convolution integral of the original image f(x,y) and the function j(x,y).

The first image enhancer 34 is a calculator which carries out the convolution integral of the original image f(x,y) with the function j(x,y). The function j(x,y) has a parameter of the radius R which is a function of age. Therefore, the first enhancement parameter setting device 16 determines the function j(x,y) based on values set by the age dial 14.

Then, the compensated image q(x,y) is input into the second image enhancer 35 which compensates for influences of the spatial frequency characteristic varied over age. Human recognition function with respect to the spatial frequency is equivalent to a low pass filter. Namely, human eyes cannot recognize the spatial frequency higher than a certain cut off frequency. As a result, edges of an image is blurred to the old. An impulse response function n(x) of the system which blurs the image is defined as:

$$n(x,y) = \exp[-(x^2+y^2)/(2\sigma^2)]/[(2\pi)^{1/2}\sigma]. \tag{43}$$

A Fourier transformation of the impulse response function is denoted as N(u,v) and blurred image because of declined spatial frequency characteristic is denoted as b(x,y). Accordingly, the blurred image b(x,y) is obtained by a convolution integration of q(x,y) and n(x,y). On the other hand, the Further transformation of the function n and b with respect to spatial frequency (u,v) is denoted by N(u,v) and B(u,v), respectively. Those function satisfies the following equation:

$$B(u,v) = Q(u,v) \cdot N(u,v). \tag{44}$$

The function N(u,v) is a transfer function of the system which cuts off high frequency.

Accordingly, denoting the second compensated image as m(x,y) and the Further transformation of m(x,y) as M(u,v), the second compensated image m(x,y) are obtained by the following equation:

$$M(u,v)=Q(u,v)/N(u,v). \quad (45)$$

When the second compensated image M (u,v) is blurred by the system which cuts off high frequency, the blurred image exactly becomes an input image Q(u,v) and the original image can be recognized.

Then, a function defined by P(u,v)=1/N(u,v) is substituted for Eq. 45, and the inverse Fourier transformation of P(u,v) is defined as p(u,v). Accordingly, the compensated image m(x,y) in a real space is calculated by a convolution integration of the original input image q(x,y) and the function p(x,y).

The second image enhancer 35 is a calculator which carries out convolution integration between the original input image q(x,y) and the function p(x,y). The function p(x,y) has a cut off frequency as a parameter which is a function of age. Accordingly, the second enhancement parameter setting device 17 is a device which determines the function p(x,y) based on the values set by the age dial 14.

The second compensated picture image m(x,y) is output into the level expander 36 and expanded to the level according to inverse number of the ratio suppressed by the level suppressor 32. Then, the second compensated image picture m(x,y) is output into the driving circuit 12 and displayed by the CRT 13 on the screen.

Similarly, green and blue signals are processed respectively in the G and B signal processing devices 40 and 50.

Further, compensations for the three variables, or color balance, accommodation, and spatial frequency, can be independently carried out by adjusting each of the three sub-dials of the age dial 14. Alternatively, the composition for the three variables can be carried out inter relatedly at one time by using one value set by one age dial 14.

In the above described embodiment, both the first and second compensations are related with the spatial frequency though their transfer functions are different from each other. Accordingly, the original image can be compensated twice by the enhancement of high-frequency components, or edge enhancements of the original image for obtaining the same effect as the embodiment. Namely, the compensated image q(x,y) of the original image f(x,y) is obtained by the following equation:

$$q(x,y)=f(x,y)-\{chd^2f(x,y)/d^2x+cvd^2f(x,y)/dy^2\}. \quad (46)$$

The coefficients ch and cv in Eq. 46 are functions of the radius R on the blurred image in the first compensation and functions of the cut off frequency in high region in the second compensation. In the first and the second compensations, the coefficients ch and cv become a function of age. In this case, both of the first image enhancer 34 and the second image enhancer 35 function as calculators carrying out calculation of Eq. 46 regarding the input image f(x,y).

Further, the first enhancement parameter setting device 16 calculates the coefficients ch and cv for the first compensation based on the set age and the second enhancement parameter setting device 17 calculates a coefficients ch and cv for the second compensation based on the set age.

In the above described embodiment, an average vision characteristic of 20 years old is set as the standard sensitivity wavelength characteristic $\alpha_0(\lambda)$. Alternatively, a predetermined desirable sensitivity wavelength characteristic can be used. In this case, the original image is compensated so that the recognition light spectral distribution $O_X(\lambda)$ may be equal to the recognition light spectral distribution $O_0(\lambda)$ which a virtual human being with the standard sensitivity wavelength characteristic $\alpha_0(\lambda)$ senses to the incident light spectral distribution I($\lambda$) regardless of age or individual variations of the observer. Accordingly, the image processing device of the present invention can provide a recognizable and clear image with a constant quality regardless of age or individual variations in vision characteristics of the observers.

In the embodiment, the transfer function $(E_0(u,v)=1)$ which transmits all spatial frequency is used as the standard spatial frequency characteristic which is the standard vision characteristic for compensating for a blurred image because of defocus. Alternatively, a predetermined any spatial frequency characteristic $E_0(u,v)$ can be used as the standard. In this case, in stead of Eq. 42, the original image is compensated by:

$$Q(u,v)=F(u,v) \cdot E_0(u,v)/F(u,v). \quad (47)$$

As a result, when the observer with the transfer function E(u,v) concerning accommodation watches the compensated image Q(u,v), the image sensed by the observer is equal to the image sensed by the person with the transfer function $E_0(u,v)$ when the person watches the original image F(u,v).

In the embodiment, the transfer function $(N_0(u,v)=1)$ which transmits all spatial frequency is used as the standard spatial frequency characteristics, i.e., the standard vision characteristic, for compensating for the original image with respect to the spatial frequency characteristic. Alternatively, a predetermined any spatial frequency characteristic $N_0(u,v)$ can be used as the standard. In this case, in stead of Eq. 45, the original image is compensated by:

$$M(u,v)=Q(u,v) \cdot N_0(u,v)/N(u,v). \quad (48)$$

As a result, when the observer with a transfer function N(u,v) concerning spatial frequency watches the compensated image M(u,v), the image sensed by the observer is equal to the image sensed by the person with the transfer function $N_0(u,v)$ when the person watches the original image Q(u,v).

In the embodiment, the original image is compensated so as to eliminate the influences of age related decline in the vision characteristics. Alternatively, the original image can be compensated to eliminate the influences of the individual variations in the vision characteristics. Concretely, the cut off frequency (or compensation coefficient) can be calculated based on both the standard vision characteristics and measured individual vision characteristics. The individual vision characteristics can be measured as follows: the spectral characteristic can be obtained by measuring distribution of spectral intensity to a reflection light from the eyeground; the accommodation characteristic can be obtained by measuring nearsightedness; and the spatial frequency characteristic can be obtained by measuring contrast sensitivity utilizing an eye chart or a chart with stripes.

Figure 7:
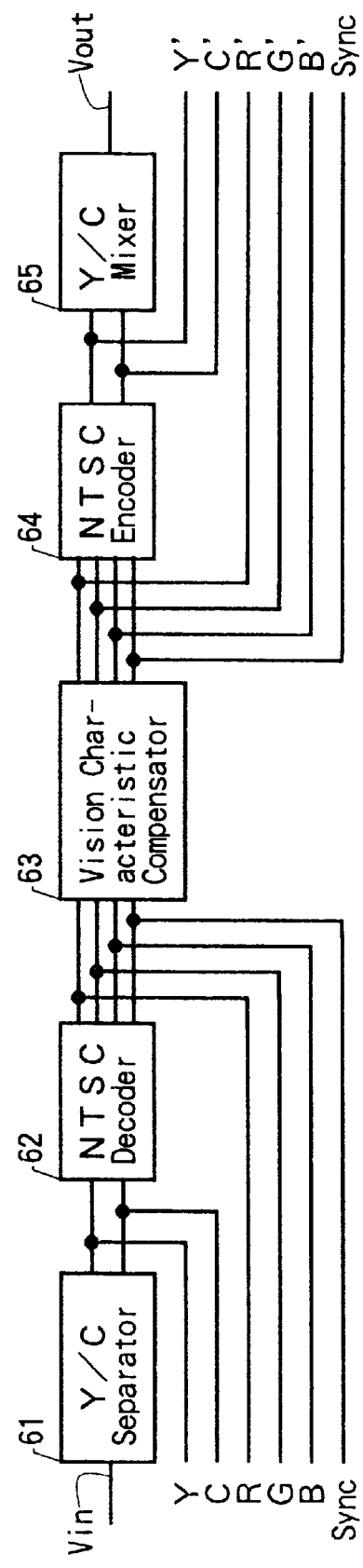
FIG. 7 is a block diagram showing a variation of the image processing device in the example.

In the above described embodiment, each of the three primary colors of the original image is compensated for its age-related declines in the three vision characteristics: sensitivity wavelength, the accommodation, and the spatial frequency. The compensation can be applied to compensation of an image signal of the NTSC system such as image signals of a television and a video tape recording system utilizing a device with a structure as shown in FIG. 7. An original image signal of NTSC system Vin is separated into a brightness signal Y and a color difference signal C by a Y/C separator 61. The signals Y and C are transformed into three color values of red (R), green (G), and blue (B) by a NTSC decoder 62. Then, a vision characteristic compensator 63 which is equivalent in function to the signal processing devices 30, 40, and 50 shown in FIG. 1, compensates each of the color values R, G, and B for the visual characteristics. Compensated color values R', G' and B' are input into and transformed into a compensated brightness signal Y' and a compensated color difference signal C' by a NTSC encoder 64. Finally, a Y/C mixer 65 composes an image signal Vout from the compensated signals Y' and C'.

A composite circuit shown in FIG. 8 can be substituted for each of the color compensator 33 in the R signal processing device 30 and the corresponding parts in the G signal processing device 40 and the B signal processing device 50, alternatively. In this composite circuit of FIG. 8, the color values R, G, and B are respectively transformed into compensated values R', G', and B' by matrix transformation. Namely, (R', G', B')=T(R, G, B), where T is a transformation matrix. Each of the elements of the matrix are determined by the values of resistances.

In the embodiment of the car navigation system described above, the transformation matrix T includes only diagonal elements.

As shown in FIG. 9, edge enhancement to each of the signals R, G, and B can be carried out by both horizontal edge enhancers 70R, 70G, and 70B and vertical edge enhancers 71R, 71G, and 71B. A color transformation circuit 69 whose function is the same as those of the color compensator 33 of the signal processing device 30 and the corresponding units of the signal processing device 40 and 50 described in FIG. 1, is a circuit which transforms the original color signals R, G, and B into the compensated signals R', G', and B' based on the transformation matrix T. Details of the horizontal edge enhancers 70R, 70G, and 70B are described in FIG. 10 and those of the vertical edge enhancers 71R, 71G, and 71B are described in FIG. 11. A RGB signal (Sh0) is separated to a signal Sh1 in every horizontal scanning line by a synchronous separator 709$h$. The signal Sh1 is delayed by small amount in time, i.e., about 100 ns, by a delay circuit 701$h$. Then, the delayed signal Sh2 is amplified double by an amplifier 703$h$. The amplified signal Sh3 is input into an add and subtraction calculator 704$h$. Further, the delayed signal Sh2 is also input into another delay circuit 702$h$ and delayed by a small amount in time, i.e., about 100 ns to be a signal Sh4. The signal Sh4 is input into the add and subtraction calculator 704$h$ and another add and subtraction calculator 706$h$.

Further, the add and subtraction calculator 704$h$ where three outputs Sh1, Sh3 and Sh4 are input, outputs the signal Sh5 by deducting Sh3 from Sh1 and adding Sh4 thereto. The obtained value Sh5 through calculation by the add and subtraction calculator 704$h$ is equal to a secondary differential value by a difference calculation and is input into a coefficient setting device 705$h$ which multiplies the signal Sh5 by a coefficient ch0 (corresponds to the coefficient ch of Eq. 46) so as to obtain a signal Sh6. The signal Sh6 as well as the signal Sh2 are input into a add and subtraction calculator 706$h$. By multiplying the signal Sh5, by the coefficient ch0 and deducting the multiplied signal Sh5, from the signal Sh2, an output of the add and subtraction calculator 706$h$ or Sh6 is obtained whose edge is enhanced.

Figure 10:
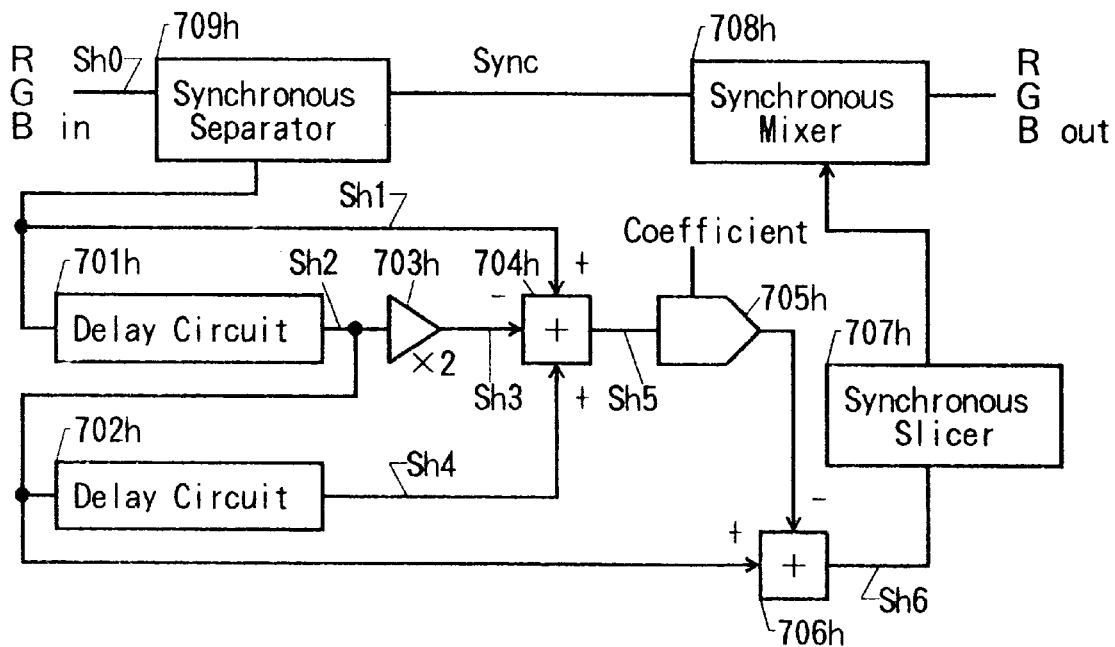
FIG. 10 is a block diagram showing a structure of a horizontal edge enhancer.
Figure 12:
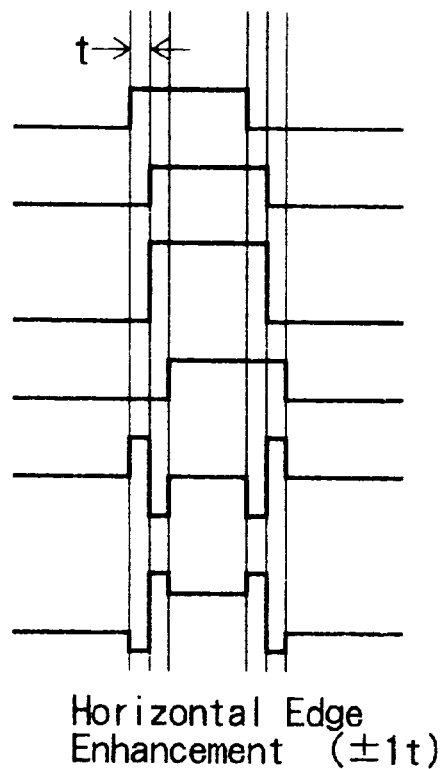
FIGS. 12 and 13 are timing charts showing signal processing steps by the horizontal edge enhancer.

FIG. 12 shows wave forms of each output of the circuits in FIG. 10. Edge width of each of the wave forms is altered by varying delay time of the delay circuits 701$h$ and 702$h$.

Figure 13:
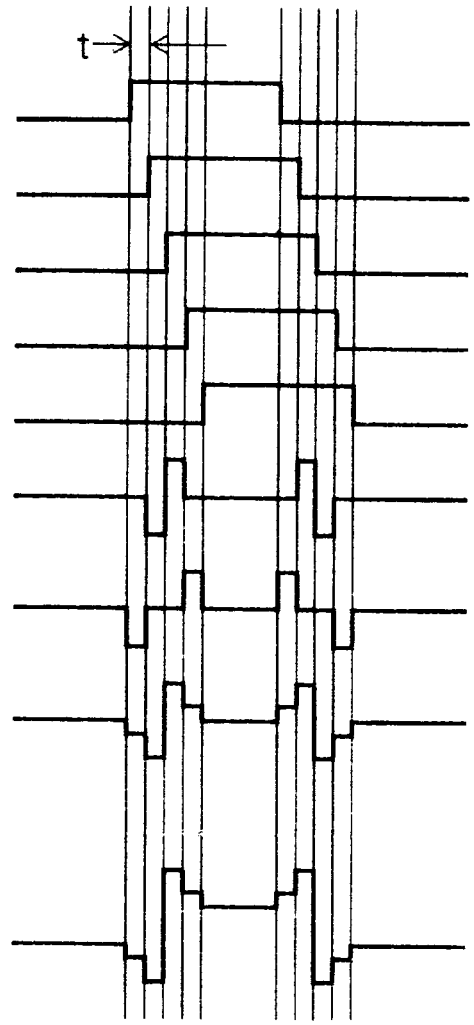

Further, installing the third or more delay circuits in each of the horizontal edge enhancers 70R, 70G, and 70B enables to obtain differential wave forms in steps shape. FIG. 13 shows wave forms of processed signals at each circuit when four delay circuits are installed. Sh11 corresponds to Sh1 which is the separated signal, and Sh12 corresponds to Sh2 which is delayed by one period. In addition, Sh14 is a delayed signal by three periods and Sh15 a delayed signal by four periods. Through these four signals Sh11, Sh12, Sh13, and Sh14, a secondary differential signal Sh16 and a modified secondary differential signal Sh17 are calculated. Utilizing proportional constants ch1 and ch2, edge enhanced signal in steps shape, Sh19 is calculated by:

$$Sh19=ch1\ (Sh13-Sh12+Sh13-Sh14)+ch2\ (Sh12-Sh11+Sh14-Sh15)+Sh13. \quad (49)$$

As another method of edge enhancement, secondary differential value is calculated by obtaining difference between the original signal and its processed signal through a low pass filter. In this case, varying the cut-off frequency of the low-pass filter enables to change edge width.

Figure 11:
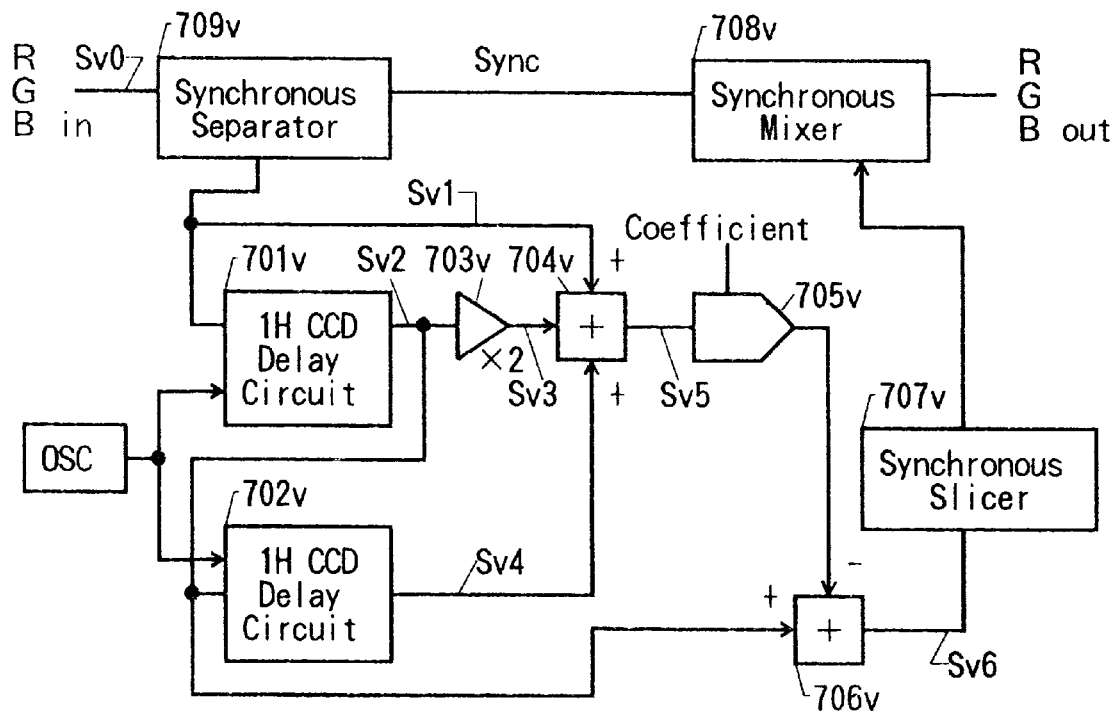
FIG. 11 is a block diagram showing a structure of a vertical edge enhancer.

FIG. 11 shows details of the vertical edge enhancers 71R, 71G, and 71B. Only the difference between them and the horizontal edge enhancers 70R, 70G, and 70B resides in delay time. In the vertical edge enhancers, delay time is one horizontal scanning period (1H) instead of t. Other circuit structure of FIG. 11 is the same as those in FIG. 10. Namely, as shown in FIG. 14, a signal Sv5 which corresponds to a secondary differential value is produced from signals Sv2 and Sv4 which are obtained by difference between a signal Sv1 and its delayed signal by one and two horizontal scanning lines. A signal Sv6 whose enhancement amount is adjusted is obtained by multiplying Sv5 by a proportional constant cv0.

Further, similar to FIG. 13, third or more delay circuits can be installed in each of the vertical edge enhancers 71R, 71G, and 71B. FIG. 15 shows wave forms of processed signals at each circuit when four delay circuits are installed in the vertical edge enhancers 71R, 71G, and 71B. Sv12 in FIG. 15 corresponds to Sv2 in FIG. 14 which is a delayed signal by 1H and Sv13 in FIG. 15 corresponds to Sv4 which is a delayed signal by 2H. In addition, Sv14 which is delayed by 3H arid Sv15 which is delayed by 4H are generated. Through these four signals Sv11, Sv12, Sv13, and Sv14, a secondary differential signal Sv16 and a modified secondary differential signal Sv17 are calculated. Utilizing proportional constants cv1 and cv2, edge enhanced signal in steps shape, Sv19 is calculated by:

$$Sv19=cv1(Sv13-Sv12+Sv13-Sv14)+cv2(Sv12-Sv11+Sv14-Sv15)+Sv13. \quad (50)$$

In FIG. 9, a color transformation circuit 69, the horizontal edge enhancers 70R, 70G, and 70B, and the vertical edge enhancers 71R, 71G, and 71B are arranged in this order. Their arrangements can be altered without impeding signal processing efficiency.

Figure 16:
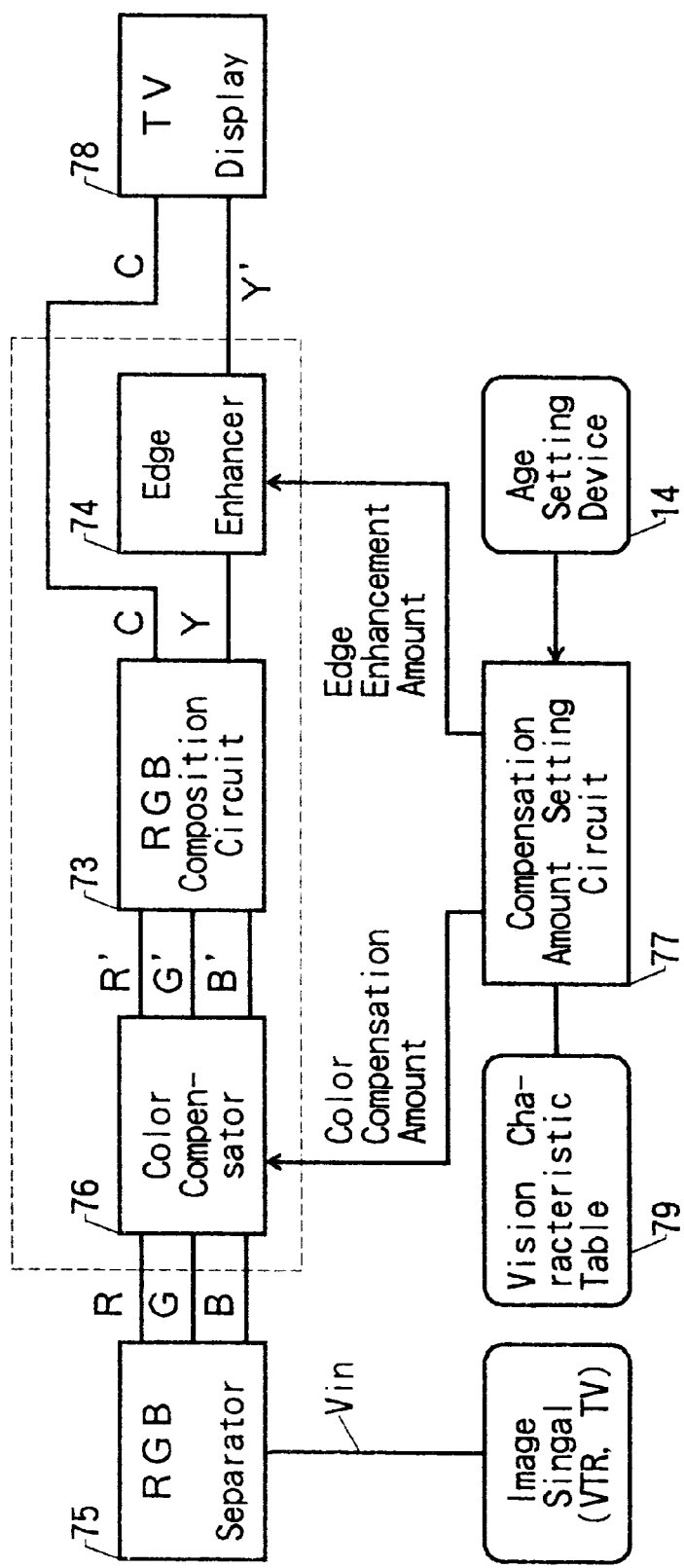
FIGS. 16 and 17 are block diagrams each showing a variation of the image processing device in the example.

Further, sensitivity wavelength characteristic may be compensated in each of the color values R, G, and B, and then, edge enhancement may be carried out in brightness signals of NTSC system as shown in FIG. 16.

An image signal Vin is separated into three color values R, G, and B by a RGB separator 75. Then, each of the color signals are compensated for sensitivity wavelength characteristic as described above. Compensated color values R', G', and B' are composed and then, separated into a brightness signal Y and a color signal C. The brightness signal Y is processed by an edge enhancer 74. A TV picture display 78 is driven by image signals which are compensated for the sensitivity wavelength and the spatial frequency. A color compensator 76 in FIG. 16 corresponds to the color compensation parameter setting device 15 in FIG. 1. Namely, the color compensator 76 holds a table storing compensation coefficients ch0 shown in FIG. 12, ch1 and ch2 in FIG. 13, cv0 in FIG. 14, and cv1 and cv2 in FIG. 15 in table form according to ages as similar to FIG. 4. Those coefficients ch0, ch1, ch2, cv0, cv1, and cv2 correspond to the coefficient ch and cv in Eq. 46. Further, a compensation amount setting circuit 77 in FIG. 16 which corresponds to the parameter setting devices 15, 16, and 17 in FIG. 1, interpolates from values in a vision characteristic table 79 according to the coefficient c corresponding to an age value set by the age setting dial 14.

Figure 17:
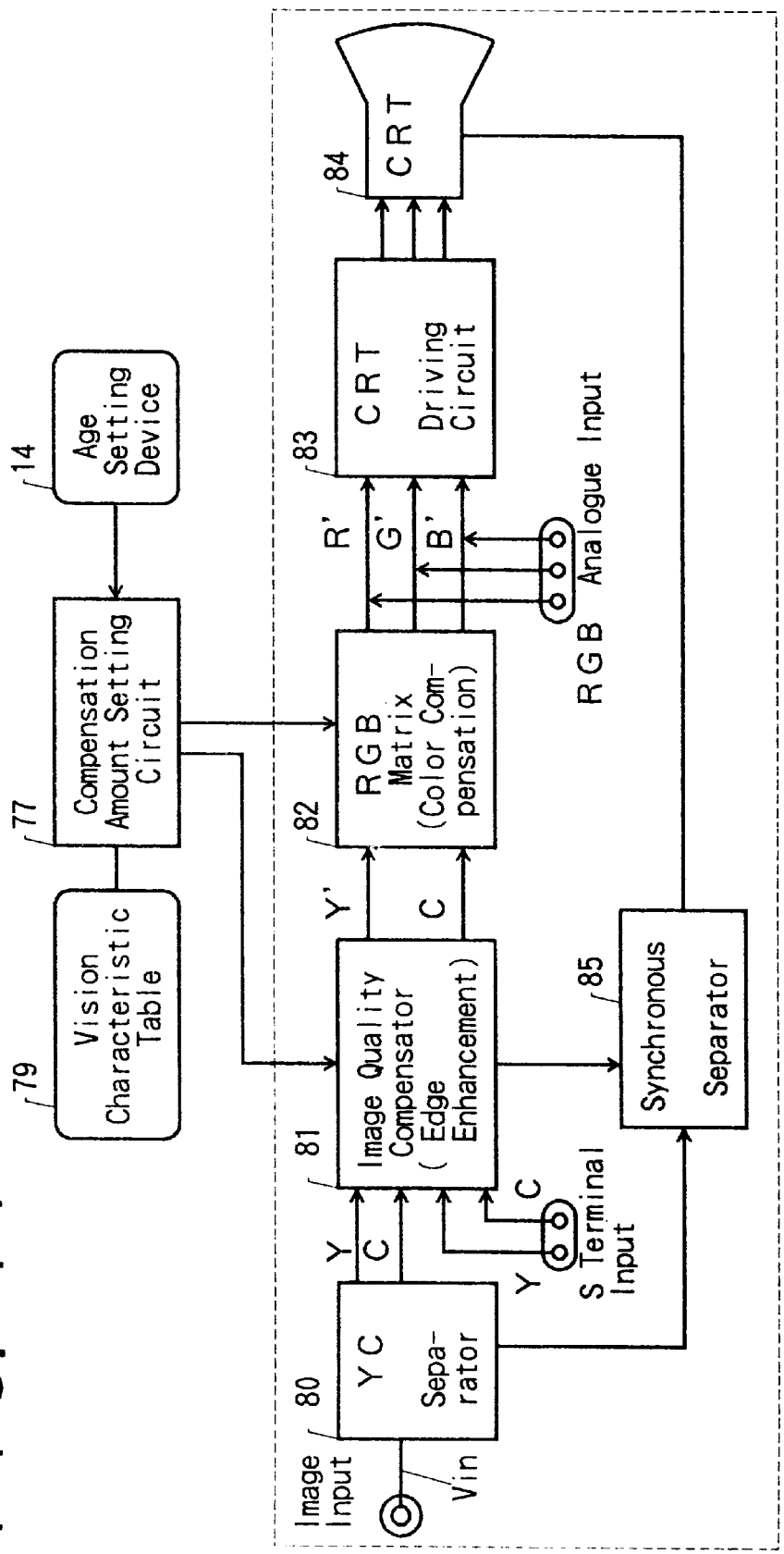

Further, as shown in FIG. 17, an image signal Vin is divided into a brightness signal Y and a color signal C by a YC separator 80. An image quality compensator 81 processes the brightness signal Y for edge enhancement. Then, an RGB matrix 82 transforms the edge enhanced brightness signal Y' and the color signal C into RGB signals. Sensitivity wavelength characteristic is compensated by matrix transformation with the RGB matrix 82. Then, the compensated signals R', G' and B' are input into a CRT driving circuit 83 and amplified. Finally, a compensated image based on the compensated color signals R', G', and B' is displayed in a CRT 84.

Figure 18:
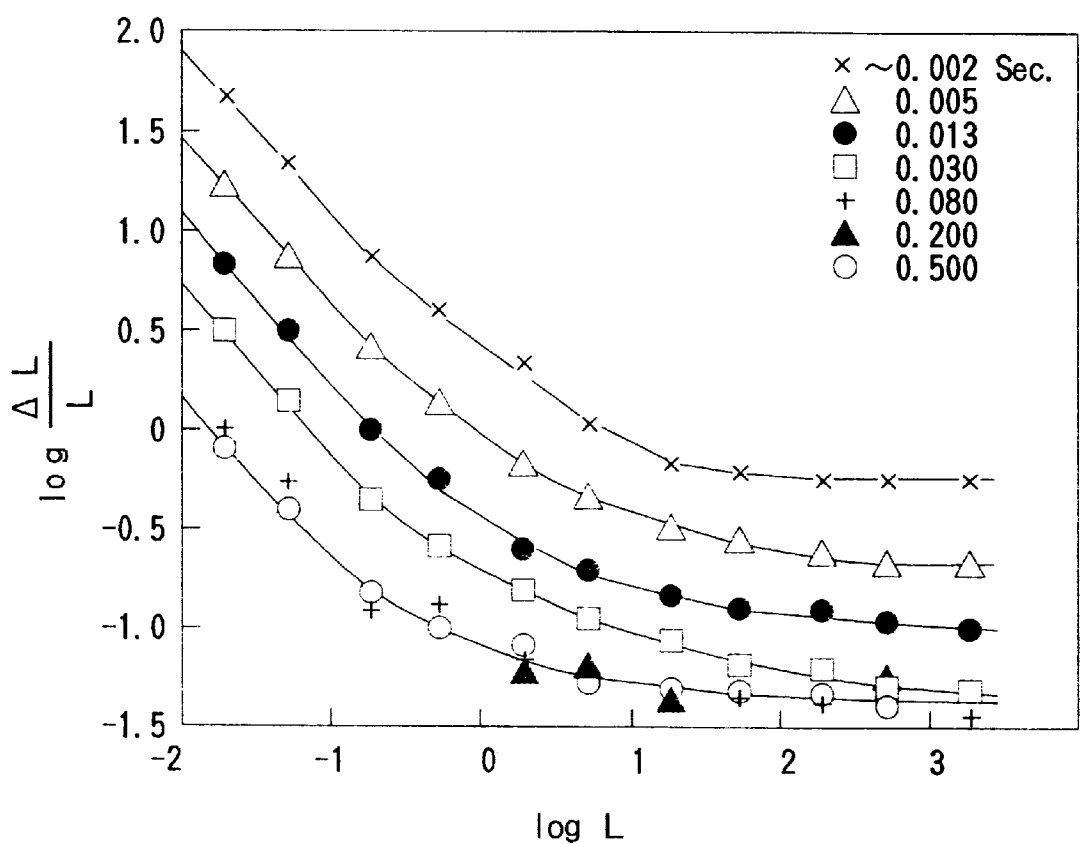
FIG. 18 is a graph showing relations between contrast sensitivity and a brightness value for explaining an image compensation using display time as a parameter.

Besides compensation for sensitivity wavelength and edge enhancement, a brightness value characteristic of contrast sensitivity may be compensated as a vision characteristic. FIG. 18 is a graph showing a relation between brightness values and contrast sensitivities using displayed time as a parameter. The more the brightness value decreases, the more contrast sensitivity a $\Delta L/L$ decreases. Accordingly, the gradient of the brightness values are compensated at high degree where the brightness value is low. The compensation amount is determined according to age or individual variations of an observer.

Further, FIG. 18 also indicates decrease of a contrast sensitivity $\Delta L/L$ as display time becomes shorter. Accordingly, contrast is emphasized at high degree when the display time or recognition time is short. Degree of contrast compensation is varied according to age or individual variations of an observer.

Figure 19:
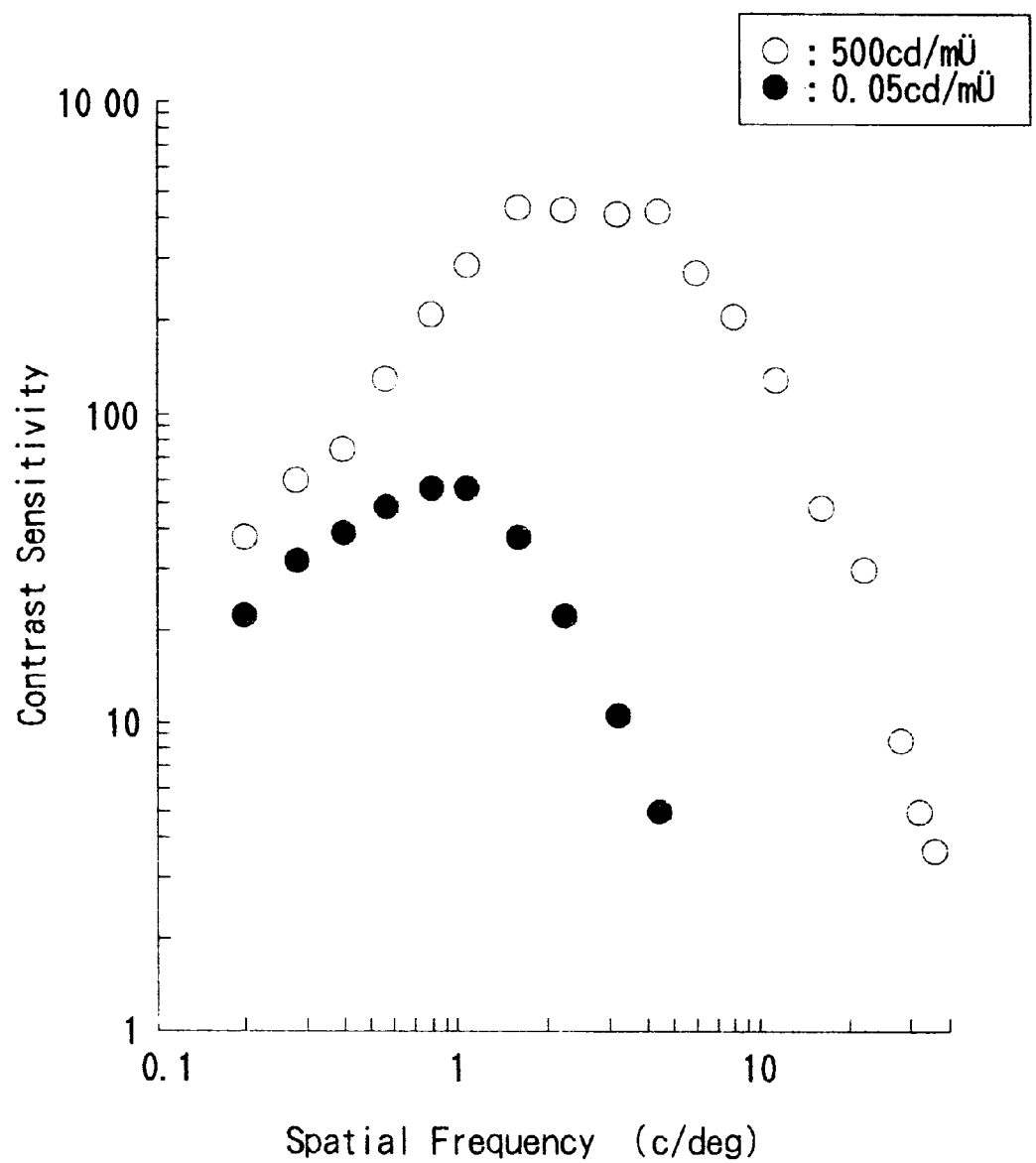
FIG. 19 is a graph showing a relation between contrast sensitivity and spatial frequency for explaining an image compensation using luminance as a parameter.

FIG. 19 is a graph showing a relation between a contrast sensitivity and a spatial frequency using luminance as a parameter. The higher the spatial frequency becomes, the lower the contrast sensitivity becomes. Accordingly, the contrast is emphasized more where the spatial frequency is higher. Degree of the contrast compensation is varied according to age or individual variations of an observer.

Further, FIG. 19 also indicates more decline of contrast sensitivity as luminance becomes lower. Accordingly, contrast is more emphasized where luminance is lower. Degree of the contrast compensation is varied according to age or individual variations of an observer.

Figures 20A, 20B:
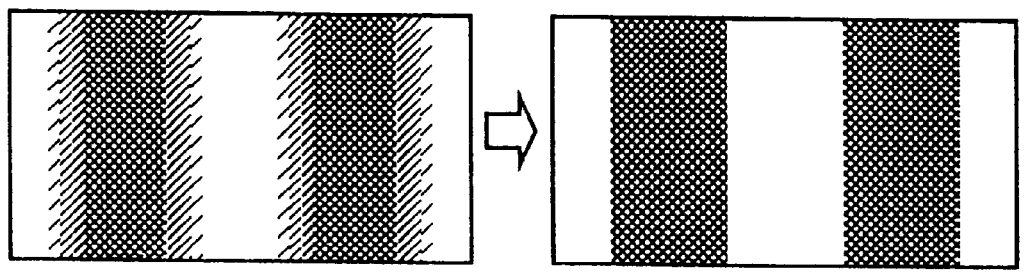
FIG. 20 is a explanatory view for an image compensation based on sensitivity hue difference characteristic.
Figures 20C, 20D:
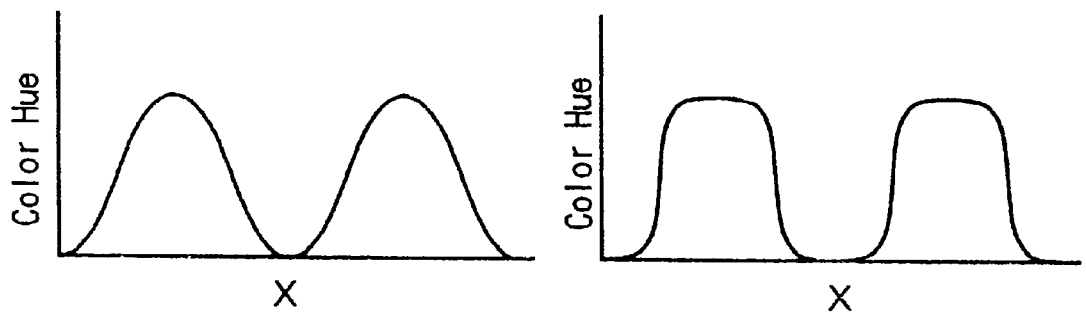

As the other vision characteristic, a color difference sensitivity varies according to age or individual variations. Edge enhancement to changing in a color hue may be carried out as shown in FIG. 20.

In the above described embodiment of a car navigation system, the color signals R, G, and B were compensated separately. Alternatively, utilizing the NTSC system, a brightness signal Y and a color difference signal C can be generated from the three color values R, G, and B, and the former may be compensated for edge enhancement and the latter for the sensitivity wavelength characteristic.

While the invention has been described in connection with a specific exemplary embodiment of a car navigation system, it is to be understood that the invention is not to be limited to the disclosed embodiments. Rather, the present invention is intended to include various modifications and equivalent arrangements, such as a compensation device for displayed images and a simulator which displays compensated images. The present may be applied to electric glasses for the old, placing a TV camera before and a display behind the user, compensating the recorded image by the TV camera and displaying a compensated image on the display and a head mount display (HMD). As further variations, the present invention can be applied to image compensations for a projector, a computer display, and a printer, and a virtual image compensation. The spirit and scope of the invention are clarified by the appended claims.

What is claimed is:

1. An image compensating device comprising:

compensation means for compensating for an original image based on a human vision characteristic of an observer of the image, and upon a predetermined standard vision characteristic which is a vision characteristic of a human visual system other than that of the observer and at a standard age which is independent of the age of the observer; and display means for displaying a compensated image by said compensation means, wherein said compensation means compensates an original image such that a compensated image observed by the observer is substantially equal to the original image observed by a standard person of the standard age, said compensation means compensates an original image based on a spatial frequency characteristic of contrast sensitivity of a human visual system, and said compensation means compensates an original image based on a wavelength characteristic of contrast sensitivity for a human visual system, wherein said compensation means compensates said original image based on a standard sensitivity wavelength characteristic $\alpha_0(\lambda)$ of said standard person and a sensitivity wavelength characteristic $\alpha_x(\lambda)$ of said observer of age x, where $\alpha_0(\lambda)$ is defined as a ratio of an incident light spectral distribution $I(\lambda)$ to a recognition light spectral distribution $O_0(\lambda)$ of said standard person and said $\alpha_x(\lambda)$ is defined as a ratio of said $I(\lambda)$ to a recognition light spectral distribution $O_x(\lambda)$ of said observer.

2. An image compensating device according to claim 1, wherein said human vision characteristic involves age related changes.

3. An image compensating device according to claim 1, said human vision characteristic and said predetermined standard vision characteristic are of the same kind.

4. An image compensating device according to claim 1, wherein a compensation amount by said compensation means is determined by the age of the observer.

5. An image compensating device according to claim 1, wherein the standard age is less than the age of the observer.

6. An image compensating device according to claim 1, wherein said compensation means compensates said original image based on a relative sensitivity wavelength characteristic $A_x(\lambda)$ of said observer which is defined as a ratio of said sensitivity wavelength characteristic $\alpha_x(\lambda)$ to said standard sensitivity wavelength characteristic $\alpha_0(\lambda)$.

7. An image compensating device according to claim 6, wherein said compensation means compensates said original image based on a brightness spectral characteristic $I'(\lambda)$ as a product of said incident light spectral distribution $I(\lambda)$ from said original image and an inverse relative sensitivity wavelength characteristic $1/A_x(\lambda)$.

8. An image compensating device according to claim 7, wherein said compensation means calculates compensated color brightness values R', G' and B' by $R'=\int L'(\lambda)h_R(\lambda)d\lambda$, $G'=\int I'(\lambda)h_G(\lambda)d\lambda$ and $B'=\int I'(\lambda)h_B(\lambda)d\lambda$, respectively, where $h_R(\lambda)$, $h_G(\lambda)$ and $h_B(\lambda)$ are retinal spectral sensitivity characteristics to a red color light, a green and a blue, respectively.

9. An image compensating device according to claim 6, wherein said compensation means compensates said original image based on three color brightness values R, G and B and retinal relative sensitivities, $A_R$, $A_G$ and $A_B$ to a red color light, a green and a blue, respectively, where $A_R$ is defined as $\int I(\lambda)h_R(\lambda)d\lambda/\int[1/A_x(\lambda)]I(\lambda)h_R(\lambda)d\lambda$, $A_G$ as $\int I(\lambda)h_G(\lambda)d\lambda/\int[1/A_x(\lambda)]I(\lambda)h_G(\lambda)d\lambda$ and $A_B$ as $\int I(\lambda)h_B(\lambda)d\lambda/\int[1/A_x(\lambda)]I(\lambda)h_B(\lambda)d\lambda$ and $(\lambda)h_R$, $(\lambda)h_G$ and $(\lambda)h_B$ are retinal spectral sensitivity characteristics to a red color light, a green, and a blue, respectively.

10. An image compensating device according to claim 9, wherein said retinal relative sensitivities $A_R$, $A_G$ and $A_B$ are $1/A_x(\lambda_R)$, $1/A_x(\lambda_c)$ and $1/A_x(\lambda_B)$, respectively, where $\lambda_R$, $\lambda_G$ and $\lambda_B$ are single wavelengths representing said respective colors.

11. An image compensating device according to claim 9, wherein said $I(\lambda)$ is obtained by composing said three color brightness values R, G and B.

12. An image compensating device according to claim 9, wherein said retinal relative sensitivities $A_R$, $A_G$ and $A_B$ are calculated by interpolation from many sets of predetermined values of said retinal relative sensitivities corresponding to three color brightness value sets of R, G, and B.

13. An image compensating device comprising:

compensation means for an original image based on a human vision characteristic of an observer of the image, and upon a predetermined standard vision characteristic which is a vision characteristic of a human visual system other than that of the observer and at a standard age which is independent of the age of the observer; and display means for displaying a compensated image by said compensation means, wherein said compensation means compensates an original image such that a compensated image observed by the observer is substantially equal to the original image observed by a standard person of the standard age, said compensation means compensates an original image based on a spatial frequency characteristic of contrast sensitivity of a human visual system, and said compensation means compensates an original image base on a wavelength characteristic of contrast sensitivity for human visual system, wherein said compensation means compensates said original image based on three color brightness values R, G and B of said original image and brightness values $R_0$, $G_0$ and $B_0$ recognized standard person, wherein said compensation means compensates said original image by $R'=R/A_R$, $G'=G/A_G$ and $B'=B/A_B$, where $A_R$, $A_G$ and $A_B$ are relativities of each retina cell for three primary colors, respectively, and R', G' and B' are compensated three color brightness values, respectively.

14. An image compensating device according to claim 13, wherein said relative sensitivities $A_R$, $A_G$ and $A_B$ are defined as $R_x/R_0$, $G_x/G_0$ and $B_x/B_0$, respectively, where $R_x$, $G_x$ and $B_x$ are brightness value of each color recognized by said observer, respectively.

15. An image compensating device according to claim 14, wherein said $R_x$, $G_x$ and $B_x$ are defined as $R_x=k\int T_x(\lambda)S(\lambda)r(\lambda)h_R(\lambda)d\lambda$, $G_x=k\int T_x(\lambda)S(\lambda)r(\lambda)h_G(\lambda)d\lambda$ and $B_x=k\int T_x(\lambda)S(\lambda)r(\lambda)h_B(\lambda)d\lambda$, respectively, and said $R_0$, $G_0$ and $B_0$ are defined as $R_0=k\int T_0(\lambda)S(\lambda)r(\lambda)h_R(\lambda)d\lambda$, $G_0=k\int T_0(\lambda)S(\lambda)r(\lambda)h_G(\lambda)d\lambda$ and $B_0=k\int T_0(\lambda)S(\lambda)r(\lambda)h_B(\lambda)d\lambda$, respectively, where $T_x(\lambda)$ is a spectral transmittance of eyeballs of said observer, $S(\lambda)$ is a spectral characteristic of an illumination, $r(\lambda)$ is a spectral reflectance of said original image, $h_R(\lambda)$, $h_G(\lambda)$ and $h_B(\lambda)$ are retinal sensitivity characteristic of each of said primary colors, respectively, and $T_0(\lambda)$ is a spectral transmittance of eyeballs of said standard person.

16. An image compensating device according to claim 13, wherein said relative sensitivities $A_R$, $A_G$ and $A_B$ are defined as $A_R=\int S(\lambda)r(\lambda)h_R(\lambda)d\lambda/\int[T_0(\lambda)/T_x(\lambda)]S(\lambda)r(\lambda)h_R(\lambda)d\lambda$, $A_G=\int S(\lambda)r(\lambda)h_G(\lambda)d\lambda/\int[T_0(\lambda)/T_x(\lambda)]S(\lambda)r(\lambda)h_G(\lambda)d\lambda$ and $A_B=\int S(\lambda)r(\lambda)h_B(\lambda)d\lambda/\int[T_0(\lambda)/T_x(\lambda)]S(\lambda)r(\lambda)h_B(\lambda)d\lambda$ where $T_x(\lambda)$ is a spectral transmittance of eyeballs of said observer, $S(\lambda)$ is a spectral characteristic of an illumination, $r(\lambda)$ is a spectral reflectance of said original image, $h_R(\lambda)$, $h_G(\lambda)$ and $h_B(\lambda)$ are retinal sensitivity characteristic of each of said primary colors, respectively, and $T_0(\lambda)$ is a spectral transmittance of eyeballs of said standard person.

17. An image compensating device according to claim 16, wherein said $T_0(\lambda)$ is equal to 1 for any value length $\lambda$.

18. An image compensating device according to claim 13, wherein said relative sensitivities $A_R$, $A_g$ and $A_B$ are defined as $A_R=\int T_0(\lambda)S(\lambda)r(\lambda)h_R(\lambda)d\lambda/\int[1/T_x(\lambda)]S(\lambda)r(\lambda)h_R(\lambda)d\lambda$, $A_G=\int T_0(\lambda)S(\lambda)r(\lambda)h_G(\lambda)d\lambda/\int[1/T_x(\lambda)]S(\lambda)r(\lambda)h_G(\lambda)d\lambda$ and $A_B=\int T_0(\lambda)S(\lambda)r(\lambda)h_B(\lambda) d\lambda/\int[1/T_x(\lambda)]S(\lambda)r(\lambda)h_B(\lambda)d\lambda$ where $T_x(\lambda)$ is a spectral transmittance of eyeballs of said observer, $S(\lambda)$ is a spectral characteristic of an illumination, $r(\lambda)$ is a spectral reflectance of said original image, $h_R(\lambda)$, $h_G(\lambda)$ and $h_B(\lambda)$ are retinal sensitivity characteristic of each of said primary colors respectively, and $T_0(\lambda)$ is a spectral transmittance of eyeballs of said standard person.

19. An image compensating device according to claim 13, wherein said relative sensitivities $A_R$, $A_G$ and $A_B$ are defined as $A_R=\int[1/T_0(\lambda)]S(\lambda)r(\lambda)h_R(\lambda)d\lambda/\int[1/T_x(\lambda)]S(\lambda)r(\lambda)h_R(\lambda)d\lambda$, $A_G=\int[1/T_0(\lambda)]S(\lambda)r(\lambda)h_G(\lambda)d\lambda/\int[1/T_x(\lambda)]S(\lambda)r(\lambda)h_G(\lambda)d\lambda$ and $A_B=\int[1/T_0(\lambda)]S(\lambda)r(\lambda)h_B(\lambda)d\lambda/\int[1 T_x(\lambda)]S(\lambda)r(\lambda)h_B(\lambda)d\lambda$ where $T_x(\lambda)$ is a spectral transmittance of eyeballs of said observer, $S(\lambda)$ is a spectral characteristic of an illumination, $r(\lambda)$ is a spectral reflectance of said original image, $h_R(\lambda)$, $h_G(\lambda)$ and $h_B(\lambda)$ are retinal sensitivity characteristic of each of said primary colors, respectively, and $T_0(\lambda)$ is a spectral transmittance of eyeballs of said standard person.

* * * * *

UNITED STATES PATENT AND TRADEMARK OFFICE
CERTIFICATE OF CORRECTION

PATENT NO.   : 6,160,576  
DATED        : December 12, 2000  
INVENTOR(S)  : Kazunori Higuchi et al.

Page 1 of 1

It is certified that error appears in the above-identified patent and that said Letters Patent is hereby corrected as shown below:

Column 19,  
Line 1, change "L" to -- I' --;  
Line 30, insert -- compensating for -- after "compensation means for";  
Line 49, insert -- a -- before "human visual system";  
Line 56, change "relativities" to -- relative sensitivities --.

Column 20,  
Line 47, insert -- / -- before "$T_x(\lambda)]S(\lambda)r$".

Signed and Sealed this

Eleventh Day of December, 2001

Attest:

NICHOLAS P. GODICI  
Attesting Officer    Acting Director of the United States Patent and Trademark Office